United States Patent
Milne et al.

(10) Patent No.: US 10,277,280 B2
(45) Date of Patent: *Apr. 30, 2019

(54) CONFIGURATION OF DATA AND POWER TRANSFER IN NEAR FIELD COMMUNICATIONS

(71) Applicant: Sony Interactive Entertainment LLC, San Mateo, CA (US)

(72) Inventors: James Richard Milne, Ramona, CA (US); True Xiong, San Diego, CA (US); Charles McCoy, San Diego, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/347,717

(22) Filed: Nov. 9, 2016

(65) Prior Publication Data

US 2017/0063431 A1 Mar. 2, 2017

Related U.S. Application Data

(63) Continuation-in-part of application No. 14/460,224, filed on Aug. 14, 2014, now Pat. No. 9,843,360,
(Continued)

(51) Int. Cl.
*H04B 5/00* (2006.01)
*H04W 12/06* (2009.01)
(Continued)

(52) U.S. Cl.
CPC .......... *H04B 5/0031* (2013.01); *H02J 7/0054* (2013.01); *H02J 7/025* (2013.01);
(Continued)

(58) Field of Classification Search
CPC .................................................. H04B 5/0031
(Continued)

(56) References Cited

U.S. PATENT DOCUMENTS 3,985,357 A 10/1976 Miller
4,123,511 A 10/1978 Heintze
(Continued)

FOREIGN PATENT DOCUMENTS

CN 101783931 A 7/2010
WO WO2009130199 A1 10/2009
(Continued)

OTHER PUBLICATIONS

International Search Report dated Apr. 22, 2016 for Taiwan App. No. 104121483. 2 pages (including translation).
(Continued)

*Primary Examiner* — Joseph Chang
(74) *Attorney, Agent, or Firm* — Carr & Ferrell LLP

(57) ABSTRACT

Some embodiments disclosed herein provide a method for configuring wireless power and data transfer between consumer electronic (CE) devices. The method comprises identifying a plurality of antenna systems including at least a first antenna system and a second antenna system. At least the first antenna system is cooperated with a first CE device and the second antenna system is cooperated with a separate second CE device. Each of the plurality of antenna systems comprises a power transfer antenna and one or more communications antennas. The system provides a graphical user interface to illustrate each of the identified antenna systems, and receives user instructions corresponding to at least two of the identified antenna systems, to generate configuration instructions in accordance with the user instructions, and to configure selected CE devices in accordance with the configuration instructions.

20 Claims, 9 Drawing Sheets

Related U.S. Application Data which is a continuation-in-part of application No. 14/290,409, filed on May 29, 2014, now Pat. No. 9,577,463, which is a continuation-in-part of application No. 14/290,426, filed on May 29, 2014.

(51) Int. Cl.

| | |
|---|---|
| *H04L 12/24* | (2006.01) |
| *H04W 4/80* | (2018.01) |
| *H02J 7/00* | (2006.01) |
| *H02J 7/02* | (2016.01) |
| *H02J 50/20* | (2016.01) |

(52) U.S. Cl.
CPC ............ *H02J 50/20* (2016.02); *H04B 5/0037* (2013.01); *H04L 41/22* (2013.01); *H04W 4/80* (2018.02); *H04W 12/06* (2013.01)

(58) Field of Classification Search
USPC ........................................................ 307/104
See application file for complete search history.

(56) References Cited

U.S. PATENT DOCUMENTS

| | | | |
|---|---|---|---|
| 4,301,207 | A | 11/1981 | Schomerus |
| 4,340,053 | A | 7/1982 | Sarui |
| 4,463,949 | A | 8/1984 | McCoy, Sr. et al. |
| 4,625,336 | A | 12/1986 | Derderian |
| 4,962,935 | A | 10/1990 | Williams |
| 4,992,003 | A | 2/1991 | Perach |
| 5,154,266 | A | 10/1992 | Bieber et al. |
| 5,201,075 | A | 4/1993 | Svetich |
| 5,219,316 | A | 6/1993 | Huffman |
| 5,413,328 | A | 5/1995 | Glancey et al. |
| 5,639,243 | A | 6/1997 | Ryan et al. |
| 5,755,405 | A | 5/1998 | Socha et al. |
| 5,927,233 | A | 7/1999 | Mainini et al. |
| 6,401,250 | B1 | 6/2002 | McNabb |
| 6,438,755 | B1 | 8/2002 | MacDonald et al. |
| 6,588,840 | B1 | 7/2003 | Lombardo |
| 6,742,636 | B2 | 6/2004 | Godshaw |
| 6,810,831 | B1 | 11/2004 | Opfel |
| 6,910,447 | B1 | 6/2005 | Azarian |
| 6,946,817 | B2 | 9/2005 | Fischer et al. |
| 7,323,981 | B2 | 1/2008 | Peel et al. |
| 7,328,671 | B2 | 2/2008 | Kates |
| 7,416,123 | B2 | 8/2008 | Saperstein et al. |
| 7,438,356 | B2 | 10/2008 | Howman et al. |
| 7,451,927 | B2 | 11/2008 | Saperstein et al. |
| 7,626,966 | B1 | 12/2009 | Ruiter et al. |
| 7,714,708 | B2 | 5/2010 | Brackmann et al. |
| 7,753,826 | B1 | 7/2010 | Oliver et al. |
| 7,768,150 | B2 | 8/2010 | Platania et al. |
| 7,770,539 | B1 | 8/2010 | Zimmerman et al. |
| 7,818,820 | B2 | 10/2010 | Tsujimoto |
| 7,916,025 | B2 | 3/2011 | Locker et al. |
| 7,962,186 | B2 | 6/2011 | Cui et al. |
| 8,149,748 | B2 | 4/2012 | Bata |
| 8,233,846 | B2 | 7/2012 | Rofougaran |
| 8,253,557 | B2 | 8/2012 | Ani et al. |
| 8,366,570 | B1 | 2/2013 | DeMarco et al. |
| 8,526,970 | B2 | 9/2013 | Wala et al. |
| 8,568,191 | B2 | 10/2013 | Rehkemper et al. |
| 8,583,182 | B2 | 11/2013 | Piirainen et al. |
| 8,609,454 | B2 | 12/2013 | Dai et al. |
| 8,624,743 | B2 | 1/2014 | Langer et al. |
| 8,719,001 | B1 | 5/2014 | Izdepski et al. |
| 8,878,671 | B2 | 11/2014 | Buchheim et al. |
| 9,577,463 | B2 | 2/2017 | McCoy et al. |
| 9,654,179 | B2 | 5/2017 | Shultz |
| 2004/0125493 | A1 | 7/2004 | Shimotono et al. |
| 2004/0141635 | A1 | 7/2004 | Liang et al. |
| 2004/0167367 | A1 | 8/2004 | Beierle |
| 2005/0034083 | A1 | 2/2005 | Jaeger |
| 2005/0127868 | A1 | 6/2005 | Calhoon et al. |
| 2005/0259033 | A1 | 11/2005 | Levine |
| 2005/0284405 | A1 | 12/2005 | Pomakoy-Poole et al. |
| 2006/0063540 | A1 | 3/2006 | Beuck |
| 2006/0080072 | A1 | 4/2006 | Lachman et al. |
| 2006/0154642 | A1 | 7/2006 | Scannell |
| 2006/0242901 | A1 | 11/2006 | Casimaty et al. |
| 2007/0069687 | A1 | 3/2007 | Suzuki |
| 2007/0130893 | A1 | 6/2007 | Davies |
| 2007/0138272 | A1 | 6/2007 | Saperstein et al. |
| 2007/0138273 | A1 | 6/2007 | Saperstein et al. |
| 2007/0152479 | A1 | 7/2007 | Howman et al. |
| 2007/0243296 | A1 | 10/2007 | Bourassa et al. |
| 2008/0036610 | A1 | 2/2008 | Hokuf et al. |
| 2008/0120768 | A1 | 5/2008 | Tsujimoto |
| 2008/0173257 | A1 | 7/2008 | Steiner et al. |
| 2008/0229704 | A1 | 9/2008 | Augustyniak et al. |
| 2009/0118869 | A1 | 5/2009 | Cauchy et al. |
| 2009/0203367 | A1 | 8/2009 | Pamminger et al. |
| 2010/0119755 | A1 | 5/2010 | Chung et al. |
| 2010/0123778 | A1 | 5/2010 | Hada |
| 2010/0152545 | A1 | 6/2010 | Ramsay |
| 2010/0295687 | A1 | 11/2010 | Kuzniar et al. |
| 2011/0005466 | A1 | 1/2011 | Furth |
| 2011/0031928 | A1 | 2/2011 | Soar |
| 2011/0105099 | A1 | 5/2011 | Roll |
| 2011/0156640 | A1 | 6/2011 | Moshfeghi |
| 2012/0069051 | A1 | 3/2012 | Hagbi et al. |
| 2012/0099800 | A1 | 4/2012 | Llano et al. |
| 2012/0184200 | A1 | 7/2012 | Chutorash et al. |
| 2012/0303939 | A1 | 11/2012 | Cain et al. |
| 2012/0319487 | A1 | 12/2012 | Shah |
| 2013/0056929 | A1 | 3/2013 | Rehkemper et al. |
| 2013/0068942 | A1 | 3/2013 | Verenchikov |
| 2013/0093220 | A1 | 4/2013 | Pajic |
| 2013/0134923 | A1 | 5/2013 | Smith et al. |
| 2013/0141251 | A1 | 6/2013 | Sims |
| 2013/0292976 | A1 | 11/2013 | Kane |
| 2014/0023060 | A1 | 1/2014 | Apte et al. |
| 2014/0025805 | A1 | 1/2014 | Apte et al. |
| 2014/0104046 | A1 | 4/2014 | Howell |
| 2014/0117921 | A1 | 5/2014 | Suomela |
| 2014/0118635 | A1 | 5/2014 | Yang |
| 2014/0148095 | A1 | 5/2014 | Smith et al. |
| 2014/0179463 | A1 | 6/2014 | Giles et al. |
| 2015/0340911 | A1* | 11/2015 | Bell ................. H02J 17/00 307/104 |
| 2015/0348413 | A1 | 12/2015 | Han et al. |
| 2015/0349537 | A1 | 12/2015 | Milne et al. |
| 2015/0349572 | A1 | 12/2015 | McCoy |
| 2016/0019515 | A1 | 1/2016 | Milne et al. |
| 2016/0019788 | A1 | 1/2016 | Milne et al. |
| 2016/0021492 | A1 | 1/2016 | Carlsson et al. |
| 2016/0021493 | A1 | 1/2016 | Milne et al. |
| 2016/0021510 | A1 | 1/2016 | Milne et al. |
| 2016/0049993 | A1 | 2/2016 | McCoy et al. |
| 2016/0126779 | A1 | 5/2016 | Park |

FOREIGN PATENT DOCUMENTS

| | | |
|---|---|---|
| WO | WO2013105920 A2 | 7/2013 |
| WO | WO2018089144 A1 | 5/2018 |

OTHER PUBLICATIONS

Office Action dated Apr. 22, 2016 for Taiwan App. No. 104121483. 17 pages (including translation).
Azimi, R. et al., "Vehicular Networks for Collision Avoidance at Intersections," Society for Automotive Engineers (SAE) World Congress, Apr. 2014. 11 pages.
Dahiya, A. et al., "A Comparative Study of MANET and VANET Environment," Journal of Computing, www.sites.google.com/site/JournalofComputing/, Jul. 2010, vol. 2, Issue 7, ISSN 2151-9617. pp. 87-92.
Eichler, S. et al., "Simulation of Car-to-Car Messaging: Analyzing the Impact on Road Traffic," IEEE Computer Society; 13th Annual Meeting of the IEEE International Symposium on Modeling, Analy-

(56) References Cited

OTHER PUBLICATIONS sis, and Simulation of Computer and Telecommunications Systems (MASCOTS), Sep. 27-29, 2005. pp. 1-10.
Gozalvez, J. et al., "IEEE 802.11p Vehicle to Infrastructure Communications in Urban Environments," IEEE Communications Magazine, vol. 50 No. 5, pp. 176-183, May 2012.
Kosch, T. et al., "The Scalability Problem of Vehicular Ad Hoc Networks and How to Solve It," www.alexandria.unisg.ch/publikationen/3097, IEEE Wireless Communications Magazine, vol. 13, No. 5, S36, (Oct. 2006). pp. 2-8.
Rawat, D., "Enhancing VANET Performance by Joint Adaptation of Transmission Power and Contention Window Size," IEEE Transaction on Parallel and Distributed Systems, vol. 22 No. 9, pp. 1528-1535, Sep. 2011. pp. 1-8.
Saeed, Y. et al., "Obstacle Management in VANET using Game Theory and Fuzzy Logic Control," ACEEE International Journal on Communication, vol. 4 No. 1, Jul. 2013. pp. 9-13.
The Seventh ACM International Workshop on Vehicular Inter-NETworking (VANET 2010) in conjunction with ACM MobiCom 2010, Sep. 24, 2010. pp. 1-3.
Zhang, T. et al., "VNTA sub-TC," www.danielwireless.com/vnta/, IEEE Communications Society, Jun. 2014. 1 page.
Eveready Industries India Ltd., "Mobile Power Pack (2200aAH)," http://www.ultimamobilepower.com/products/pdfs/um-22.pdf, Dec. 3, 2012. 1 page.
Eveready Industries India Ltd., "Eveready Ultima Mobile Power Pack UM22," http://www.ultimamobilepower.com/products/UM-22.aspx, Dec. 3, 2012. 1 page.
Computerworld Inc., "Intel wants your next PC to have no wires," http://www.computerworld.com/s/article/9248824/Intel_wants_your_next_PC_to_have_no_wires; Jun. 4, 2014. pp. 1-4.
"International Search Report" and "Written Opinion of the International Searching Authority," Patent Cooperation Treaty Application No. PCT/US2017/055778, dated Jan. 2, 2018, 11 pages.

\* cited by examiner

CONFIGURATION OF DATA AND POWER TRANSFER IN NEAR FIELD COMMUNICATIONS

CROSS-REFERENCE TO RELATED APPLICATIONS

This application is a Continuation-in-Part of U.S. utility patent application Ser. No. 14/290,409 filed May 29, 2014, entitled "Portable Device to Portable Device Wireless Power Transfer Methods and Systems," U.S. utility patent application Ser. No. 14/290,426 filed May 29, 2014, entitled "Scalable Antenna System," and U.S. utility patent application Ser. No. 14/460,224 filed Aug. 14, 2014, entitled "Method and System for Use in Configuring Multiple Near Field Antenna Systems," all of which are incorporated by reference in their entireties for all purposes.

BACKGROUND

This disclosure generally relates to consumer electronic devices, and more specifically to methods and systems for configuring wireless power and data transmission between one or more consumer electronic devices.

The number and types of consumer electronic devices continues to increase. Furthermore, many of these consumer electronic devices are portable. As such, battery power is often critical. In many instances, a user may have to limit their use of a device because of limited remaining power. Similarly, a user may be unable to effectively use a device because of a lack of power stored on the device.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. One or more embodiments of this disclosure advantageously address the needs above as well as other needs by providing methods, processes, apparatuses and systems of configuring wireless data and power transfer.

In one aspect of this disclosure, there is provided a method for configuring wireless power and data transfer between consumer electronic (CE) devices. The method comprises identifying a plurality of antenna systems including at least a first antenna system and a second antenna system, wherein at least the first antenna system is cooperated with a first CE device and the second antenna system is cooperated with a separate second CE device, wherein each of the plurality of antenna systems comprises a power transfer antenna and one or more communications antennas, wherein the power transfer antennas is configured to enable wireless electrical power transfer between the power transfer antenna and at least one other power transfer antenna of another one of the plurality of antenna systems, and wherein each of the one or more communications antennas is configured to enable wirelessly transmitting and receiving communications with at least one further communications antenna. The method further comprises providing a graphical user interface, wherein the graphical user interface is configured to illustrate each of the identified antenna systems and communicational relationships between each of the identified antenna systems, and wherein the graphical user interface is further configured to enable a user to interact with the graphical user interface. The method comprises receiving, through the graphical user interface, user instructions corresponding to at least two of the identified antenna systems, wherein the user instructions include wireless coupling configurations dictating how at least one of the identified antenna systems is to wirelessly transfer power to at least one other of the identified antenna systems or how at least one of the identified antenna systems is to wirelessly transfer data to at least one other of the identified antenna systems. The method comprises generating configuration instructions in accordance with the wireless coupling configurations and causing communication of the configuration instructions to selected CE devices to direct each of the identified antenna systems to be configured in accordance with the configuration instructions.

In other aspects of the disclosure, there is provided a system and an apparatus for implementing the steps of the above-outlined method for configuring wireless power and data transfer between CE devices. Additional aspects, objects, advantages, and novel features of the examples will be set forth in part in the description, which follows, and in part will become apparent to those skilled in the art upon examination of the following description and the accompanying drawings or may be learned by production or operation of the examples. The objects and advantages of the concepts may be realized and attained by means of the methodologies, instrumentalities, and combinations particularly pointed out in the appended claims.

BRIEF DESCRIPTION OF THE DRAWINGS

The above and other aspects, features and advantages of several embodiments of the present disclosure will be more apparent from the following more particular description thereof, presented in conjunction with the following drawings. Embodiments are illustrated by way of example and not limitation in the figures of the accompanying drawings, in which like references indicate similar elements and in which.

Figure 1A:
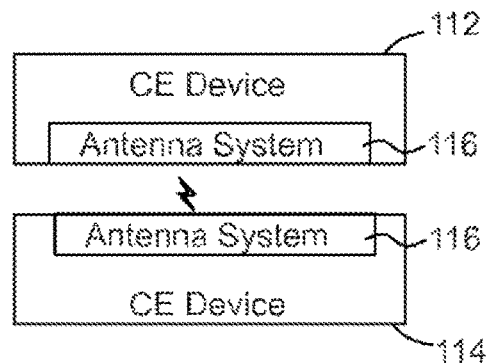
FIG. 1A shows a simplified block diagram of two portable CE devices positioned proximate each other, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION OF EXAMPLE EMBODIMENTS

The following detailed description of embodiments includes references to the accompanying drawings, which form a part of the detailed description. Approaches described in this section are not prior art to the claims and are not admitted to be prior art by inclusion in this section. Reference throughout this specification to "one embodiment," "an embodiment," "some embodiments," "some implementations" or similar language means that a particular feature, structure, or characteristic described in connection with an example implementation is included in at least one embodiment of the present disclosure. Thus, appearances of the phrases "in one embodiment," "in an embodiment," "in some embodiments," and similar language throughout this specification may, but do not necessarily, all refer to the same embodiment.

Furthermore, the described features, structures, or characteristics of embodiments may be combined in any suitable manner in one or more implementations. In the following description, numerous specific details are provided, such as examples of programming, software modules, user selections, network transactions, database queries, database structures, hardware modules, hardware circuits, hardware chips, and the like to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure.

Aspects of the embodiments will now be presented with reference to a system and method for configuring wireless power and data transfer between consumer electronic devices. These systems and methods will be described in the following detailed description and illustrated in the accompanying drawings by various blocks, components, circuits, steps, operations, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean instructions, instruction sets, code, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

Accordingly, in one or more exemplary embodiments, the functions described may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

It should be also understood that the terms "first," "second," "third," and so forth can be used herein to describe various elements. These terms are used to distinguish one element from another, but not to imply a required sequence of elements. For example, a first element can be termed a second element, and, similarly, a second element can be termed a first element, without departing from the scope of present teachings.

Moreover, it shall be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled"

to another element, there are no intervening elements present. Other words used to describe the relationship between elements should be interpreted in a like fashion (e.g., "between" versus "directly between," "adjacent" versus "directly adjacent," and so forth). Spatially relative terms, such as "beneath," "below," "lower," "above," "upper" and the like may be used to describe an element or feature's relationship to another element(s) and/or feature(s) as, for example, illustrated in the drawings.

The term "consumer electronic (CE) device" shall be construed to mean any portable or non-portable electronic device having data processing capabilities, including a mobile device, cellular phone, mobile phone, smart phone, tablet computer, laptop computer, desktop computer, computer workstation, server, network device, network appliance, modem, router, personal digital assistant, music player, multimedia player, vehicle navigation system, television device, set-top-box, game controller, entertainment device, portable gaming device (e.g., a PlayStation Portable, etc.), car stereo, vehicle entertainment system (e.g., car, airplane, train, etc.), car charging device, battery pack, portable charger, power tool, quadcopter ("drone"), remotely controlled aircraft, device for virtual reality (VR) gaming, portable plug-in device (e.g., Universal Serial Bus (USB)-port portable device, High-Definition Multimedia Interface (HDMI)-port plug-in device), and the like.

According to various embodiments of this disclosure, it can be beneficial in many instances to allow consumer electronic devices to wirelessly transmit and/or share power between two or more consumer electronic devices. For example, some embodiments allow one cell phone to obtain power from and/or use battery power from another cell phone. It is a common situation where two people have smart phones with very different levels of battery charge remaining. For example, multiple portable devices (e.g., smart phones) are in a location with one or more of them having a significantly low battery charge where the person(s) with the low battery level would like to or needs to do things with their device. This may be due to the fact that they are the type of person that is always interfacing with their phone, or this may be due to the fact that there are a lot of remote people communicating with that person, possibly due to a big recent event where communication is important. Since these remote people communicating with the person with the smart phone with the low power already have the person's phone number in their contacts, it is often not convenient for that remote person to just use another person's phone that has more battery power. Similarly, a person's mobile device may be low on battery power because it has not been charged recently, while another person's device may have a nearly full battery because it has recently been charged.

The embodiments of this disclosure enable one to configure and implement wireless power transfer from one CE device to another CE device, or vice versa. In addition, the embodiments of this disclosure enable one to configure and implement wireless data transfer from one CE device to another CE device, or vice versa. The wireless power and data transfer can be provided simultaneously when required, but not necessarily. Moreover, the embodiments of this disclosure enable one to operatively connect more than two CE devices for wireless power and/or data transfer.

According to embodiments of this disclosure, a user can configure wireless power and data transfer between one or more pairs of CE devices. For example, when there are a plurality CE devices provided, the user can configure and authorize power transfer between at least some pairs of four CE devices, as well as configure and authorize data transfer between the same or different pairs of CE devices. Once the user configures wireless power and data transfer between certain CE devices, configuration information can be stored in a local or remote memory. Accordingly, when these CE devices are in predetermined proximity, they can automatically start wireless power and data transfer based on the configuration information. The configuration of wireless power and data transfer can be implemented using one of the CE devices or another user device, which can be designated as a group owner. Moreover, the process of configuring wireless power and data transfer between two or more CE devices can be implemented using at least one Graphical User Interface (GUI) available on one of the CE devices or another user device.

In certain embodiments, the process of configuring wireless power and data transfer between two or more CE devices starts with collecting, by a group owner device, coupling parameters from two or more CE devices. The group owner device further provides a GUI, which graphically illustrates the CE devices to the user. The user further can manipulate control elements of the GUI to establish, modify, or remove connections between two or more pairs of the CE devices to establish wireless power or data transfer between at least two of the CE devices. The user can control various parameters of wireless power and data transfer. For example, the user can select protocols to be used for data transfer, a time to initiate wireless power or data transfer, a time to discontinue or pause wireless power or data transfer, bandwidth parameters, battery charge levels, encryption protocols, and so forth.

It should be noted, however, that wireless power and data transfer does not necessarily replace cable connections. Thus, in certain embodiments, there can be provided both wired power/data transfer of a plurality of CE devices and wireless power/data transfer between two or more CE devices of the plurality of CE devices. For example, while a pair of CE devices can be wirelessly connected to transfer power, data exchange between these CE devices can be implemented via a cable. Similarly, the pair of CE devices can be wirelessly connected to transfer data, but power transfer between these CE devices can be implemented via a cable. In addition, one pair of CE devices can be wirelessly connected to transfer data between each other, but at least one of these CE devices can be also connected to another CE device using a cable for power or data transfer. Similar but derivative implementations should be evident for those skilled in the art.

In yet additional embodiments, when CE devices are pre-configured by the user, the CE devices may be required to perform authentication prior to initiation of wireless power or data transfer. Thus, in one implementation, when one CE device comes into predetermined proximity from another CE device, they can start data exchange to perform an authenticate procedure. The authenticate procedure can involve exchanging identifications, keys, logins, passwords, requests, wireless coupling parameters, and so forth. In yet additional examples, the authenticate procedure can involve determining if one or more CE devices has a predetermined software (e.g., whether a predetermined proprietary mobile application) installed. If the authentication of CE devices is successful, wireless power or data transfer becomes authorized and can be initiated by CE devices. Alternatively, if the authentication of CE devices fails, wireless power or data transfer is not authorized and cannot be initiated by CE devices.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

Figure 1B:
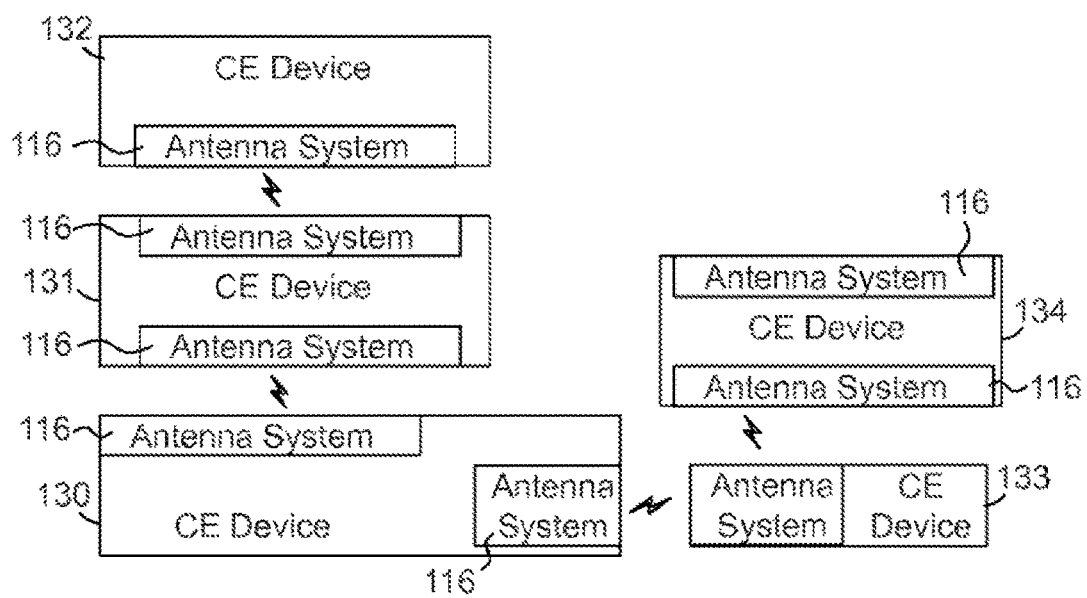
FIG. 1B illustrates multiple CE devices positioned proximate each other, in accordance with some embodiments.

FIG. 1A shows a simplified block diagram of two CE devices 112, 114 positioned proximate each other, in accordance with some embodiments. FIG. 1B illustrates multiple CE devices 130-134 positioned proximate each other, in accordance with some embodiments. The CE devices each include an antenna system, module, or circuitry 116 that is configured to provide wireless power transfer and/or wireless data communications between two or more CE devices. Accordingly, the CE devices utilize the antenna system to cooperatively couple with one or more other CE devices to enable the wireless transfer of power between at least a first CE device (e.g., CE device 112) and a second CE (e.g., CE device 114), or to wirelessly communicate between the first and second CE devices. As such, electrical power can be transferred, for example, from first CE device 112 to second CE device 114, which may allow second CE device 114 to continue to operate or to at least partially store electrical power to be used by the second CE device 114. The CE devices can be substantially any relevant CE device that is configured with an antenna system 116. As discussed above, the CE devices can be a smart phone, tablet, laptop, television, set-top-box, game controller, cell phone, portable gaming device, game console, multimedia player, entertainment system, vehicle navigation system, quadcopter, charging device, battery pack, power tool, portable charger, VR device, and the like. Further, the CE devices do not have to be the same type of device. Power or data transfer between CE devices can be established when these devices are within a predetermined range from one another, which can be up to several feet.

In some embodiments, at least one of the CE devices can include a pad, mat, container, or platform for receiving one or more other CE devices. For example, when one of the CE devices is implemented as a remotely controlled aircraft, such as a quadcopter or drone, it may include a platform for receiving another CE device, e.g., a smartphone. The use of quadcopters can be especially helpful when users of CE devices (e.g., smartphones) travel to areas with low network bandwidth or coverage, or when a battery level of a CE device becomes low and there are no power charging opportunities in the area. In these instances, a user of the CE device can request the quadcopters to arrive to an area near the user to provide wireless power transfer (e.g., to charge the user's CE device) and/or provide wireless data transfer (e.g., to provide access to the Internet, remote storage, download files, movies, etc.).

Figure 2A:
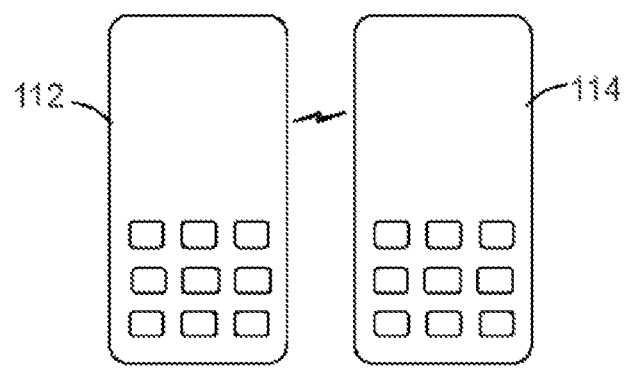
FIG. 2A shows a representation of two exemplary smart phone portable CE devices positioned proximate each other, in accordance with some embodiments.
Figure 2B:
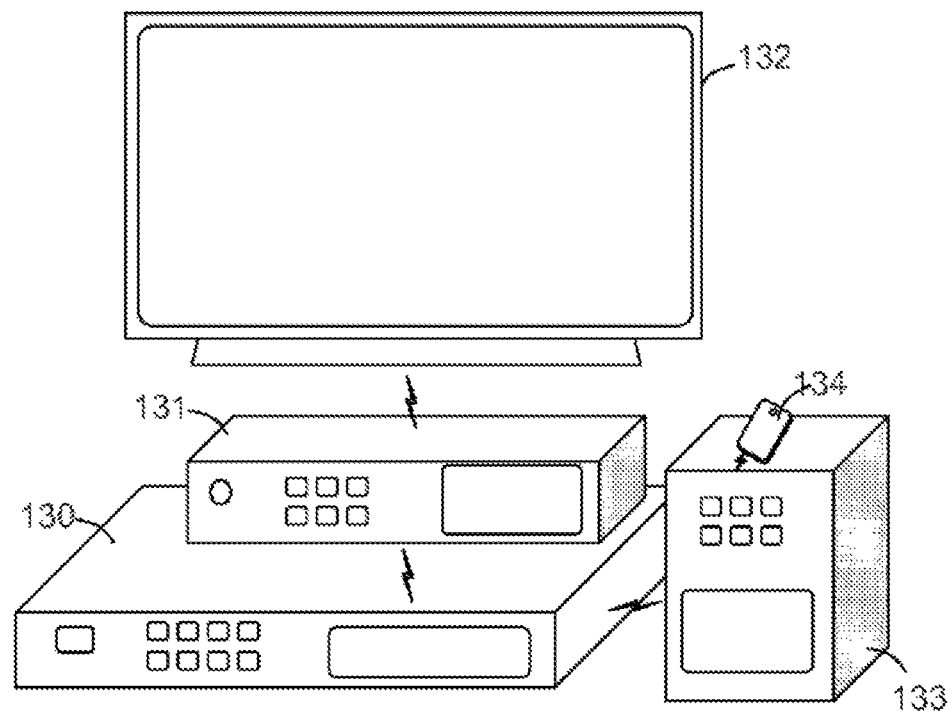
FIG. 2B shows a representation of multiple exemplary portable CE devices positioned proximate each other, in accordance with some embodiments.

FIG. 2A shows a representation of two exemplary smart phone portable CE devices 112, 114 positioned proximate each other, in accordance with some embodiments. FIG. 2B shows a representation of multiple exemplary portable CE devices 130-134 positioned proximate each other, in accordance with some embodiments. In this representation, the CE devices can be, for example, a set-top-box 130, a multimedia player 131, television 132, a tuner or stereo 133, and a smart phone 134. In this example embodiment, some or all of the CE devices 130-134 can be also connected (but not necessarily) using one or more cables, wires, or wired interface for power or data transfer.

Figure 3:
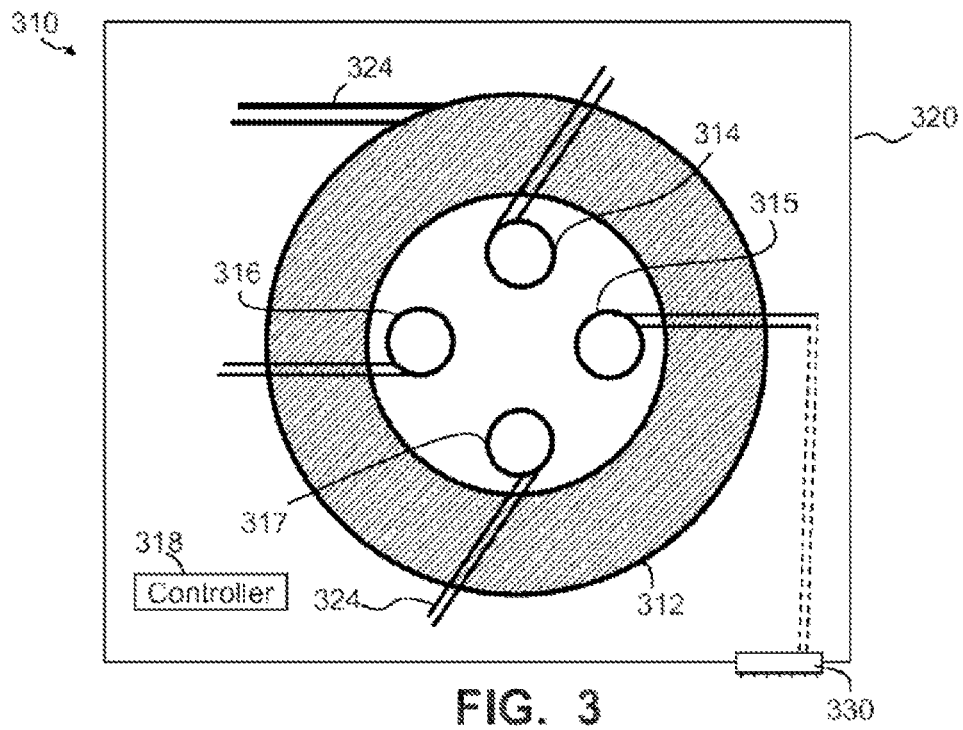
FIG. 3 depicts a simplified plane view of an exemplary antenna system, in accordance with some embodiments.

FIG. 3 depicts a simplified plane view of an exemplary antenna system 310, in accordance with some embodiments. Antenna system 310 includes an antenna array comprising one or more power transfer antennas 312 or one or more low power communications antennas 314-317. The power transfer antenna 312 is configured to enable at least one of wirelessly and inductively receiving electrical power from another consumer electronic device and wirelessly and inductively transmitting electrical power to another consumer electronic device. In many applications, the antenna system can be configured to transmit and receive power. Similarly, one or more communications antennas 314-317 are configured to wirelessly transmit and receive communications with one or more other remote devices. Further, the communications antennas and corresponding drive circuitry (not illustrated) are, in some implementations, configured to provide low power wireless communications such that the distance of the wireless communication is relatively limited.

In some embodiments, antenna system 310 includes a controller and/or one or more driver circuitries 318 that can control and/or drive the antennas 312, 314-317. The controller can further store and/or determine coupling parameters of the antenna system and/or other antenna systems. In other embodiments, some or all of the functionality of controller 318 is performed by one or more controllers and/or processors of the CE device. Further, in some embodiments, antenna system 310 includes a frame 320, base, housing, or other such structure. Each of the power transfer antenna 312 and the one or more communications antennas 314-317 include leads 324, pins, wires, or other such electrical connectors to allow the power transfer antenna and communications antennas to couple with power, control, and/or drive circuitry. The leads 324 may couple with other components within the CE device. In some implementations, antenna system 310 includes one or more connectors 330, and the leads 324 couple with a connector 330 of antenna system 310. Connector 330 can be configured to cooperate with one or more mating connectors of the CE device. In some embodiments, one or more antenna systems may be similar to the antenna systems described in co-pending U.S. application Ser. Nos. 14/290,409, 14/290,426, and 14/460,224, which are incorporated herein by reference. It is noted that in some embodiments, an antenna system 310 may not include a power transfer antenna and instead only include one or more communications antennas, while in other embodiments, an antenna system 310 may not include a communications antenna and instead only include a power transfer antenna.

Referring back to FIG. 1B, in some implementations, a CE device, such as a second CE device 131 may include two or more antenna systems that allow it to wirelessly and inductively couple with two or more different CE devices. As such, in accordance with some embodiments, wireless power transfer may be daisy chained from first CE device 130, through second CE device 131, to third CE device 132. Similarly, in some implementations, the one or more antenna systems may allow the second CE device to wirelessly daisy chain communications between first CE device 130 and third CE device 132. Further, second CE device 131 typically can independently communicate with the first and/or third CE devices, and/or implement a wireless power transfer to or from one or both of the first and third CE devices. Power transfer and/or communications may be unidirectional or bidirectional depending on an intended operation.

In some implementations, antenna system 116 allows one or more of CE devices 130-133 to operate without any externally accessible communications ports and/or power cords. Instead, for example, second CE device 131 may receive all operation power from one or both of first CE device 130 and/or third CE device 132. Similarly, the antenna system allows second CE device 131 to externally communicate with one or more other CE devices without the need for cable or fiber optic communications. For example, second CE device 131 may be a Blu-ray player operatively coupled with third CE device 132 (e.g., a television) to wirelessly communicate the multimedia content from a Blu-ray disc to the television for playback without the need for cable connections or external ports. Similarly, second CE device 131 may receive power to operate from the first and/or third CE devices. As such, in some implementations, the CE device can be designed and assembled without any external ports or connectors, and one or more antenna systems can be incorporated that allow the CE device to acquire power and communicate with one or more other CE devices. In some embodiments, CE devices and/or one or more communications antennas of one or more antenna systems in a CE device can operate without externally accessible communication ports, and in some instances, all communications with the consumer electronic device in which the antenna system is mounted are through the one or more communications antennas of one or more antenna systems.

Some embodiments are configured to define and/or control the cooperation between the multiple CE devices and/or establish a near field wireless system or network. Further, some embodiments configure antenna systems 116 to establish the communication between CE devices and/or dictate which CE device communicates with which other CE device. In some implementations, the cooperation of the CE devices defines a configuration of a near field wireless network of multiple CE devices capable of wirelessly transferring electrical power and/or wirelessly communicating between the CE devices.

Figure 4:
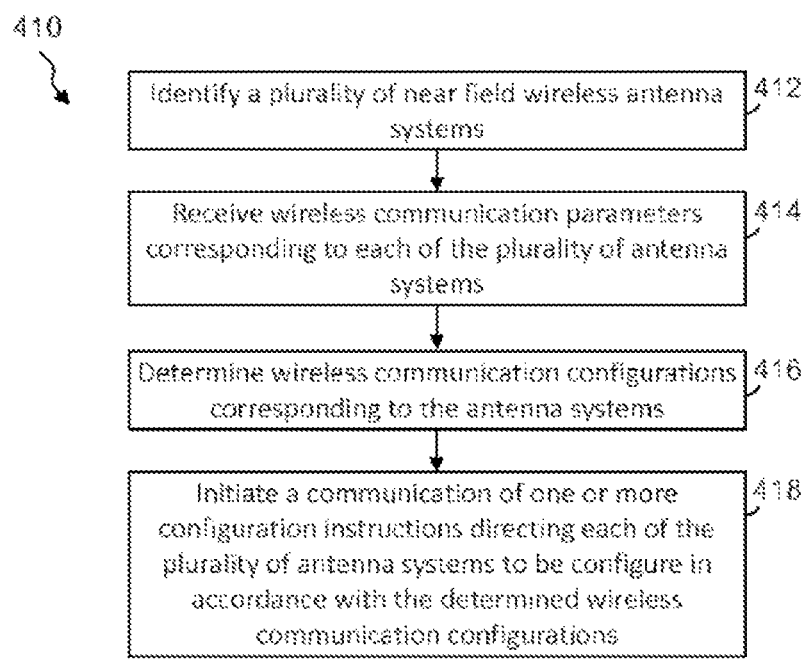
FIG. 4 shows a simplified flow diagram of an exemplary process of configuring a near field wireless network of multiple CE devices, in accordance with some embodiments.

FIG. 4 shows a simplified flow diagram of an exemplary method 410 of configuring a near field wireless network of multiple CE devices, in accordance with some embodiments. Method 410 may be performed by processing logic that may comprise hardware (e.g., decision-making logic, dedicated logic, programmable logic, Application Specific Integrated Circuit (ASIC), and microcode), software (such as software run on a general-purpose computer system or a dedicated machine), or a combination of both. In one example embodiment, the processing logic refers to a group owner, controller 318, a processor of a CE device, a computing device, or a server. Notably, below recited steps of method 410 may be implemented in an order different than described and shown in the figure. Moreover, method 410 may have additional steps not shown herein, but which can be evident for those skilled in the art from the present disclosure. Method 410 may also have fewer steps than outlined below and shown in FIG. 4.

In step 412, a plurality of near field wireless antenna systems 116 are detected and/or identified and can be communicatively cooperated. For example, two or more cooperating antenna systems can be detected, and in many instances three or more antenna systems are detected. As described above and further below, each of the plurality of antenna systems 116 comprises one or more power transfer antennas and/or one or more communications antennas for data transfer. The power transfer antenna is configured to enable wireless electrical power transfer between the power transfer antenna and at least one other power transfer antenna of another one of the plurality of antenna systems. Additionally, some implementations are configured to use directional wireless power transfer to operate at larger distances.

Further, each of the one or more communications antennas is configured to enable wirelessly transmitting and receiving data communications with at least one further communications antenna. The further communications antenna can be one of the plurality of the antenna system or may include other antennas that are not considered part of the antenna system, such as an FM antenna, a GPS receiver, a Wi-Fi antennae, or antennas for communicating with cell phone towers.

Furthermore, there can be different versions of the antenna system where the different versions have at least one additional antenna that the antenna system described above does not have to facilitate communications, but the two antenna versions could communicate with the rest of the antennas even through the at least one additional antenna does not have a corresponding antenna to communicate with.

In some example implementations, there can be multiple versions of the antennae systems where a later version is backwards compatible with earlier versions and is wirelessly communicating with at least one of the earlier versions. In some of those implementations, the later versions can have or more additional antennas in its antenna systems and may even have other additional capabilities. In another implementation, a later version can include only a subset of the antennas in its antennae system and is built to be backwards compatible such that it operates with an earlier version.

The distances over which the wireless communication can be achieved is typically consistent with distances used for wireless electrical power transfer through the power transfer antenna. In some embodiments, one or more of the communications antennas are low power communications antennas having a communication distance that is limited in range. Some embodiments are configured to communicate in accordance with Wi-Fi, Bluetooth, Near Field Communications (NFC), Transmission Control Protocol (TCP), Internet Protocol (IP), High-Definition Multimedia Interface (HDMI), and/or other such communication protocols and the range of communication is consistent with these standards. In some embodiments, the communication distance and/or the distance between the power transfer antennas can be as little as 1.0 nm, and is typically less than 15 cm, and in some implementations, the distance is less than 40 mm, while in many embodiments, the distance is less than about 5 mm. Still further, some embodiments are configured such that the communication distance of communications antennas is often limited in range to approximately those distances for which wireless electrical power transfer can be achieved through the power transfer antenna of antenna system 116.

In step 414, one or more wireless coupling and/or communication parameters (referred to generally below as coupling parameters) are received and/or determined corresponding to antenna systems 116 and/or an association between two or more of the antenna system. Typically, the wireless coupling parameters correspond to antenna systems and/or their potential coupling, association, and/or communication with other antenna systems. Further, the wireless coupling parameters can include one or more parameters that can be used in configuring a plurality of antenna systems 116 to provide, establish, and/or maintain a network of the antenna systems allowing each antenna system to communicate with and/or implement a power transfer with one or more other antenna systems. The wireless coupling parameters can include substantially any relevant parameter that can be used in determining how to configure the network of the antenna system. For example, the wireless coupling parameters can include, but are not limited to, an identification of an antenna system, number of wireless communications antennas incorporated within an antenna system, number of power transfer antennas, positioning and/or orientation of communication and/or power antennas, communication protocols and/or methods supported, signal power and/or approximate wireless communication range or distance of each communications antenna and/or associated with each communication protocol supported, approximate wireless power transfer range of the power transfer antenna, an identification of one or more other antenna systems and/or communications antennas that are within wireless power transfer and/or wireless communication range of an antenna system, wireless signal strength between one or more other antenna systems and/or communications antennas that are within wireless power transfer and/or wireless communication range of an antenna system, wireless communication protocols and/or communication methods supported by another antenna system in communication with an antenna system, antenna positioning and/or orientation (e.g., orientation relative to a case or housing of the CE device, orientation relative to another antenna system, etc.) of the antenna systems, whether a CE device is connected to an external power source or operating over local power, battery storage levels, and other such parameters or combinations of such parameters. The wireless coupling parameters can be determined locally within an antenna system and/or received from a remote antenna system.

Many of the parameters and capabilities attempt to improve coupling and alignment and/or try to line up the available signals that can be communicated (e.g., signal provided by one CE device and able to be used by another CE device) with the available antenna connections between a source CE device and a destination CE device. For some types of signals, there may only be a subset of the available antenna connections that are capable of communicating that type of signal. In some cases, the available signals may outnumber the available one or more inputs or vice-versa. Further, some implementations may provide available signals that outnumber the capacity of the available antenna connections. In such a situation, a choice or election is made, in some embodiments, as to which signals will be communicated through the system and which signals will not be communicated. For example, negotiation between communicating antenna systems and/or CE devices can achieve the selection (e.g., based on priority of available signals, signal quality, or the like, or combinations thereof), a group controller may select, a user may select (e.g., through a user interface), and so forth.

In some embodiments, the determination of the wireless coupling parameters includes a discovery process that identifies the various antenna systems and the capabilities and/or functionality of the various antenna systems. The coupling parameters at least in part define the capabilities and/or functionality of the various antenna systems. In some embodiments, the coupling parameters are locally stored within a storage medium of an antenna system (or the CE device in which the antenna system is positioned), received from a remote antenna system, obtained from a remote source, determined based on an identification of a separate antenna system, and the like, or a combination of such methods.

The capabilities, functionality, identity, and other such information is often obtained through initial communications from one or more of the antenna systems and/or between antenna systems. For example, the antenna system may communicate (e.g., via a predefined communication protocol, power modulation, etc.) its own capabilities. In some instances, the antenna system transmits its capabilities to another antenna system as part of an initiation process, such as upon initially detecting the other antenna system.

In step 416, one or more wireless coupling configurations are determined corresponding to the plurality of antenna systems and based on the wireless coupling parameters. The wireless coupling configurations at least in part dictate which one or more of the plurality of antenna systems each antenna system is to directly communicate with and/or enable power transfer there between. Further, in some embodiments, the wireless coupling configurations designate communications methods and/or protocols to be used (e.g., Wi-Fi, Bluetooth, via wireless USB, wireless Ethernet, power modulation (e.g., backscatter modulation), radio-frequency identification (RFID) communications or other such NFC, optical communication, HDMI, and/or other such communication methods or combinations of such protocols), which communications antenna of a plurality of communications antennas of an antenna system is to be used, a desired positioning and/or positional orientation of antenna system 116 and/or the CE device (which is typically dependent on an orientation of another antenna system to be communicated with), signal strength information defining a signal strength to be used in wirelessly transmitting relative to one or more communications antennas and/or communication protocols, encoding parameters, encryption parameters (e.g., encryption method, key, etc.), whether two antenna systems of a CE device are configured to operate as pass-through antenna systems, power transfer levels and/or rates, or other such information or combinations of such information. Still further, some embodiments further specify which antenna within a remote antenna system a first antenna of a first antenna system is to communicate with.

Additionally, some implementations provide one or more available antenna connections that are configured with the capacity to communicate more than one signal simultaneously, such as through interlacing of multiple signals that are less than a bandwidth of the antenna connection. In some embodiments, the available inputs and available outputs will line up in a logical way. For example, a near field wireless network may include two CE devices and/or antenna systems that each provide an HDMI output and one CE device and/or antenna system that has multiple HDMI inputs. Accordingly, the near field network can be configured and/or a group controller can determine how the inputs and outputs are to be logically aligned with each other, and in many instances a preferred and/or ideal configuration is determined automatically without user intervention (other than, in some instances, to orient the relevant CE device in accordance with instructions should such CE devices need to be physically moved to achieve desired alignment and/or efficient placement).

Further, for example, some embodiments, in determining the wireless coupling configurations, determine, based on the wireless coupling parameters, that a first communications antenna of one or more communications antennas of a first antenna system is configured to be utilized in accordance with a first predefined wireless communication protocol of a plurality of different communication protocols, and that a first communications antenna of one or more communications antennas of a second antenna system is also configured to be utilized in accordance with the predefined wireless communication protocol. The coupling configurations can then be configured to specify that the first antenna system and the second antenna system are to directly communicate utilizing their respective first communications antennas and via the predefined wireless communication protocol such that the first antenna system is configured to communicate with the second antenna system utilizing the predefined wireless communication protocol. Other factors and/or parameters may also be taken into consideration. For example, the coupling between two communications or power antennas is typically limited by a distance between the communications or power antennas. Accordingly, some embodiments, in determining coupling configurations, further determine, based at least in part on the wireless coupling parameters, whether the first antenna system and typically whether the first antenna of the first antenna system is in wireless communication and/or power transfer range with the first antenna of the second antenna system.

Other coupling and/or coupling parameters may be taken into consideration with respect to implementing and/or preventing wireless power transfers. For example, one or more parameters may designate whether a CE device is coupled with an external power source (e.g., plugged into a wall outlet) or is operating from a local power source (e.g., battery, capacitance, etc.). As such, when it is determined that two CE devices are both coupled with an external power source, a configuration instruction can be communicated with an instruction that is configured to prevent power transfer between power transfer antennas of antenna systems of the two CE devices that are coupled with and receiving power from an external power source. Additionally or alternatively, it may be determined that a first CE device is receiving power through a wireless power transfer from another CE device. Accordingly, in some implementations, the coupling configuration may restrict and/or prevent the CE device from further transferring power to a subsequent CE device. This may depend on the device from which the CE device is receiving power (e.g., if the device supplying the power is operating from a local battery).

Further, some embodiments, in determining the coupling configurations, evaluate capabilities of an antenna array of each of the antenna systems with which they may potentially couple. For example, communication compatibilities between the antenna array of a first antenna system and the antenna array a second antenna system may be identified, and wireless coupling configurations may be defined to establish a communication connection between one or more communications antennas of the first antenna system and one or more communications antennas of the second antenna system to operate in accordance with one or more of the communication compatibilities. The communication compatibilities can include communication protocols, antenna orientation, wireless range, power levels, and other such compatibilities. Further, in some instances, such coupling configurations can comprise instructions to move and/or reorient one of the first antenna system and the second antenna system to achieve a communication coupling between the one or more communications antennas of the first antenna system and one or more communications antennas of the second antenna system in accordance with the one or more communication compatibilities.

Additionally, in some implementations, one or more of the antenna systems may be configured without a power transfer antenna or without a communications antenna. Accordingly, in some embodiments, the coupling parameters typically identify the structure and/or capabilities of the antenna system (e.g., that it only includes communications antennas) and the resulting coupling configurations take these limitations into account. As such, a near field network is extendable to situations where one or more of the antenna systems do not include a power transfer antenna or do not include a communications antenna (e.g., only a portion of the antenna systems contain power transfer functionality). For example, a CE device of the near field network (or a CE device newly added to an existing network of CE devices) may include an antenna system that has one or more communication antennas, but does not include a power transfer antenna. The communication with this antenna system (and CE device) is typically managed the same as if the antenna system also has a power transfer antenna, and the coupling configurations would take into account the lack of the power transfer antenna.

Still referring to FIG. 4, in step 418, communication is initiated with one or more configuration instructions corresponding to the determined coupling configurations to at least one of antenna systems 116. The configuration instructions at least direct each of the plurality of antenna systems to be configured in accordance with the determined wireless coupling configurations. Further, in some embodiments, the configuration instructions configure a near field wireless network between the plurality of antenna systems. In some embodiments, an antenna system may cause the communication of the configuration instructions. Additionally or alternatively, a remote CE device may cause the communication of the one or more configuration instructions. The method 410 can be repeated any number of times. For example, the method 410 may be implemented as a loop that continues to determine whether one or more additional antenna systems are to be incorporated into the network of antenna systems 116 and/or whether an antenna system has been removed (e.g., powered down, moved by a user, etc.) from the network.

As described above, in some embodiments, a CE device may contain more than one antenna system 116. Referring back to FIG. 1B, first CE device 130, second CE device 131, and fifth CE device 134 each include multiple antenna systems 116. Further, both first CE device 130 and second CE device 131 are configured to communicate with multiple different CE devices (e.g., first CE device 130 communicates with second CE device 131 and the fourth CE device 133, while second CE device 131 communicates with first CE device 130 and third CE device 132). Accordingly, some embodiments are configured to allow one CE device (e.g., the first CE device) to communicate with another CE device (e.g., third CE device 132) when the first CE device is not in direct communication with and/or not within wireless range of the third CE device by using the two antenna systems 116 of second CE device 131 as pass-through antenna systems that effectively relay information between the first and third CE devices. It is noted that second CE device 131 may utilize some or all of the information received and retransmitted. Accordingly, when operating as pass-through antennas, the antenna systems are not restricted from utilizing some or all of the information and/or providing that information to the CE device with which the antenna system cooperates. Operating antenna systems as pass-through systems allows information to be daisy chain communicated through multiple antenna systems. Similarly, wireless power transfer may be daisy chained through antenna systems configured as pass-through antenna systems. For example, power may be transferred from first CE device 130, through second CE device 131, to third CE device 132.

As such, some embodiments in detecting the plurality of near field wireless antenna systems 116 detect that two or more antenna systems are within a single CE device. For example, a CE device (e.g., the second CE device) may transmit coupling parameters specifying that the CE device includes more than one antenna system and/or that the antenna systems of the CE device can operate as pass-through antenna systems. With this information, the wireless coupling configurations can define two antenna systems of the CE device as pass-through antenna systems. In this configuration, a first antenna system of the CE device can be configured to pass through at least some communications wirelessly received through the first antenna system to a second antenna system of the same CE device, and the second antenna system can be configured to wirelessly retransmit some of the wireless communications received from the first antenna system to another of the plurality of antenna systems cooperated with a separate CE device. Similarly, the second antenna system may additionally or alternatively wirelessly receive communications and forward those to the first antenna system to allow the first antenna system to transmit that information to an antenna system of a separate CE device allowing a pass-through of communications.

In some embodiments, one antenna system 116 of the plurality of antenna systems determines some or all of the coupling configurations and/or performs the method 410 to establish and/or maintain the near field network. For example, a first antenna system may operate as a group controller or network control antenna system that in some embodiments dictates the cooperation and/or coupling between two or more antenna systems. The determination of which of the antenna systems operates as the group controller can depend on one or more factors, such as but not limited to whether an antenna system (and/or the CE device in which that antenna system is positioned) can operate as a group controller and/or has the functionality to provide group control, the computational capabilities of the antenna system and/or the CE device in which the antenna system is positioned, a priority level (e.g., defined by a manufacturer, defined by an industry standard, user defined, etc.), whether the CE device associated with the antenna system includes a user interface and/or a type of user interface, when an antenna system joined the network, and/or other such factors. Additionally or alternatively, a user can designate and/or select one of the antenna systems to be the network group controller.

For example, in a linear configuration, an antenna system or a CE device at one of the ends can be designated as the group controller. The selected antenna system or CE device could be determined, for example, by which end has more inputs. As one specific example, a set of rules may be applied to select a Television (TV) being the group controller as the TV is typically on an end of a linear chain and often includes the most inputs. Additionally or alternatively, in some implementations, antenna systems and/or CE devices that may be part of the near field wireless network could negotiate amongst themselves to select which of the antenna systems and/or CE devices is to be the group controller. In some implementations, each antenna system, each CE device, and/or at least one antenna system of each CE device of the potential network includes software to allow the antenna system and/or CE device to act as a group controller. In such a situation, it may not be important which device acts as the group controller, and the selection can be based on one or more parameters, such as those described above or further described below (e.g., which device has the best user interface).

Further, rules may specify in some implementations to prefer or prioritize certain CE devices and/or antenna systems over others. For example, a rule may specify that when a first antenna system and/or first CE device supports a later version of a communication protocol than another antenna system and/or CE device, then the first antenna system and/or CE device supporting the latest version is chosen over the other device when selecting a group controller (can be also referred to as a group owner). Additionally or alternatively, there may be rules such that the CE device with the most inputs (and/or outputs) and/or with the most antenna systems would be chosen as the group controller (e.g., in a network configuration where all content and/or information is run through a home theater receiver, the home theater receiver may be chosen as the group controller).

Further, the group controller of a near field network may not be fixed with one antenna system and/or CE device, but could change dynamically. For example, the near field network may be configured such that when a CE device receives an input from a user, such as receiving a remote control key press, that CE device could signal that it wants to take over as the group controller. Such a system would result in the CE device that the user is interacting with becoming the group controller and/or implementing some control over communications.

Still further, in some embodiments, when communication is received from a device outside of the near field network (and the CE devices of the near field network communicating through the antenna systems), such as from a cell phone, the outside device can act as the group controller. In other embodiments, the outside device may implement some control over the actions of a CE device that is currently acting as the group controller, and/or a user may implement some control over the CE device acting as the group controller through the outside device.

Furthermore, in some embodiments, as the configuration of the CE devices of the near field network is changed, the choice of which CE device and/or antenna system that operates as the group controller can change dynamically. When the group controller changes, the antenna system and/or CE device that is newly acting as the group controller may start by indicating the same configuration that the old group controller specified, and then can subsequently implement changes when determined by the newly acting group controller to be beneficial to the near field network.

In some implementations, the collection of CE devices of the near field network operate without one antenna system or CE device acting as a group controller. In such a situation, each antenna system and/or CE device negotiates the communication over each antenna system with the CE device on the other end of that communication connection. This communication may take into account communication from one or more other antenna systems on the CE device, which would allow a collection of CE devices and/or antenna systems to negotiate signals being passed through without a single device controlling that configuration.

In some embodiments, a first antenna system and/or a first CE device in which the first antenna system is positioned is established as a group controller of the near field wireless network and over each of the plurality of antenna systems. This establishment can be user defined, negotiated between the plurality of antenna systems, based on one or more of the criteria described above, or other such criteria. Further, in some implementations, the near field network may have previously been established and the first antenna system may be newly joined to the network. In such instances, the first antenna system may take over group controller functionality from another antenna system (or other CE device) when another antenna system was previously designated as a group controller. In other instances, a separate device and/or service may configure the network and/or operate as a group controller. The group controller utilizes the wireless coupling parameters in determining the wireless coupling configurations. Further, the group controller communicates the one or more configuration instructions to one or more antenna systems. In some implementations, one or more of the configuration instructions are retransmitted (e.g., daisy chain transmitted) by one or more of the other antenna systems to subsequent antenna systems. Further, in some implementations, a single configuration instruction may be communicated that is used by multiple antenna systems. In other embodiments, multiple antenna configuration instructions are communicated. Typically, the group controller antenna system wirelessly communicates the one or more configuration instructions from the first antenna system to one or more of the plurality of antenna systems.

It is further noted that the near field network and/or one or more of the coupling configurations may be modified over time, such as when one or more CE devices are removed or added to the near field network. Similarly, a user may instruct modifications to the coupling between antenna systems. For example, the addition of an antenna system of another CE device may be detected after the near field wireless network is configured. Typically, additional wireless coupling parameters corresponding to the additional antenna system are received, and based on the additional coupling parameters, and in some instances some or all of the previously received coupling parameters, the modified wireless coupling configurations are determined for at least the additional antenna system and at least one of the antenna systems already incorporated into the near field network. The one or more modified wireless coupling configurations typically dictate which one or more of the plurality of antenna systems the additional antenna system is to communication with and/or allow power transfer with, and in some instances dictates which one or more of the plurality of antenna systems and the additional antenna system each is to directly communicate with. The one or more of the modified configuration instructions can be communicated, directing one or more of the plurality of antenna systems and the additional antenna system to be configured in accordance with the determined modified wireless coupling configurations and causing a reconfiguration of the near field wireless network.

For example, in some embodiments, an additional antenna system of a CE device may be detected, with the additional antenna system comprising one or more communications antennas and not including a power transfer antenna. As such, the wireless coupling parameters corresponding with this additional antenna system can be received and typically will specify that the antenna system does not include a power transfer antenna. Based on the wireless coupling parameters, including those corresponding to the additional antenna system, the wireless coupling configurations are determined for the additional antenna systems and one or more other antenna systems of the network. Again, the wireless coupling configurations dictate which one or more of the plurality of antenna systems the additional antenna system and at least one of the other antenna systems that the additional antenna systems is to directly communicate with, and with which the additional antenna system cannot provide wireless power transfer.

As described above, in some embodiments, some or all of the wireless coupling configurations may be specified and/or modified by a user. In some implementations, the user accesses a user interface that allows the user to obtain information about the antenna systems and/or CE devices, their communication and/or coupling parameters, and/or other such information. The user is able to at least in part define and/or modify the coupling configurations through the user interface. In many embodiments, the user interface is displayed on a display of one of the CE devices. In many implementations, the CE device upon which the user interface is displayed does not have to be the group controller.

The information provided and/or accessible through the user interface and/or format of the user interface may vary depending on the capabilities of the CE device and/or the display of the CE device. For example, in some implementations, the user interface may be merely textual data with one or more lines of text being displayed. The user typically can scroll through multiple lines of text to make relevant selections (e.g., selecting between ON or "OFF," designating whether a coupling is "ACCEPTED" or "DECLINED," selecting one of multiple antenna system identifiers and/or CE device identifiers, etc.). Similarly, some embodiments may display one or more tables as at least part of the user interface.

In other implementations, more information may be displayed and/or more options may be available when the CE device and/or the display is capable. Some embodiments provide a graphical user interface, and the information displayed is typically dependent on the wireless coupling parameters and/or the coupling configurations. Further, the user interface may display communicational relationships and/or positional relationships between one or more of the antenna systems. In some embodiments, the coupling parameters may include each antenna system identifying which other antenna systems it detects. Information can be generated, such as mapping that provides communicational and/or positional relationships between antenna systems. The user interface may display a representation of positioning of CE devices and/or antenna systems. Further, the user interface may additionally display parameters associated with related antenna systems or CE devices (e.g., identify communication protocols available between two antenna systems, signal strengths, power levels, power transfer capabilities, numbers of communications antennas, etc.).

In some implementations, the user interface may present in part a pictorial representation of one or more antenna systems and/or CE devices. Similarly, the user may be able to drag and drop icons and/or pictorial representations to designate couplings and/or graphically draw lines between antenna systems and/or CE devices. For example, some embodiments generate and display a graphical user interface based at least in part on the wireless coupling parameters. Further, the graphical user interface may, in some embodiments, show a pictorial representation of communicational and/or positional relationships between each of the plurality of antenna systems. The user interface can be configured to allow a user to interact with the graphical user interface to obtain information, define parameters, specify some or all of the coupling configurations, and the like. For example, modifying instructions may be received through the graphical user interface instructing that one or more of the determined wireless coupling configurations be modified. Based on the modifying instructions, one or more modified coupling configurations can be generated in accordance with the received modifying instructions, with the one or more modified coupling configurations being configured to modify how at least two of the plurality of antenna systems are to communicate with each other. These modified coupling configurations can be communicated to the relevant antenna systems (e.g., the at least two of the plurality of antenna systems).

Additional information may be displayed in the user interface and/or optionally a user can activate one or more options (e.g., drop down window, menu, or the like) that cause further information to be displayed (e.g., number of communications antennas; communication protocols being used, available, and/or associated with each antenna; which one or more communications antennas of a first antenna system are coupled with which one or more communications antenna systems of one or more other antenna systems; whether power transfer is activated; whether power transfer is actively occurring; etc.).

Figure 9:
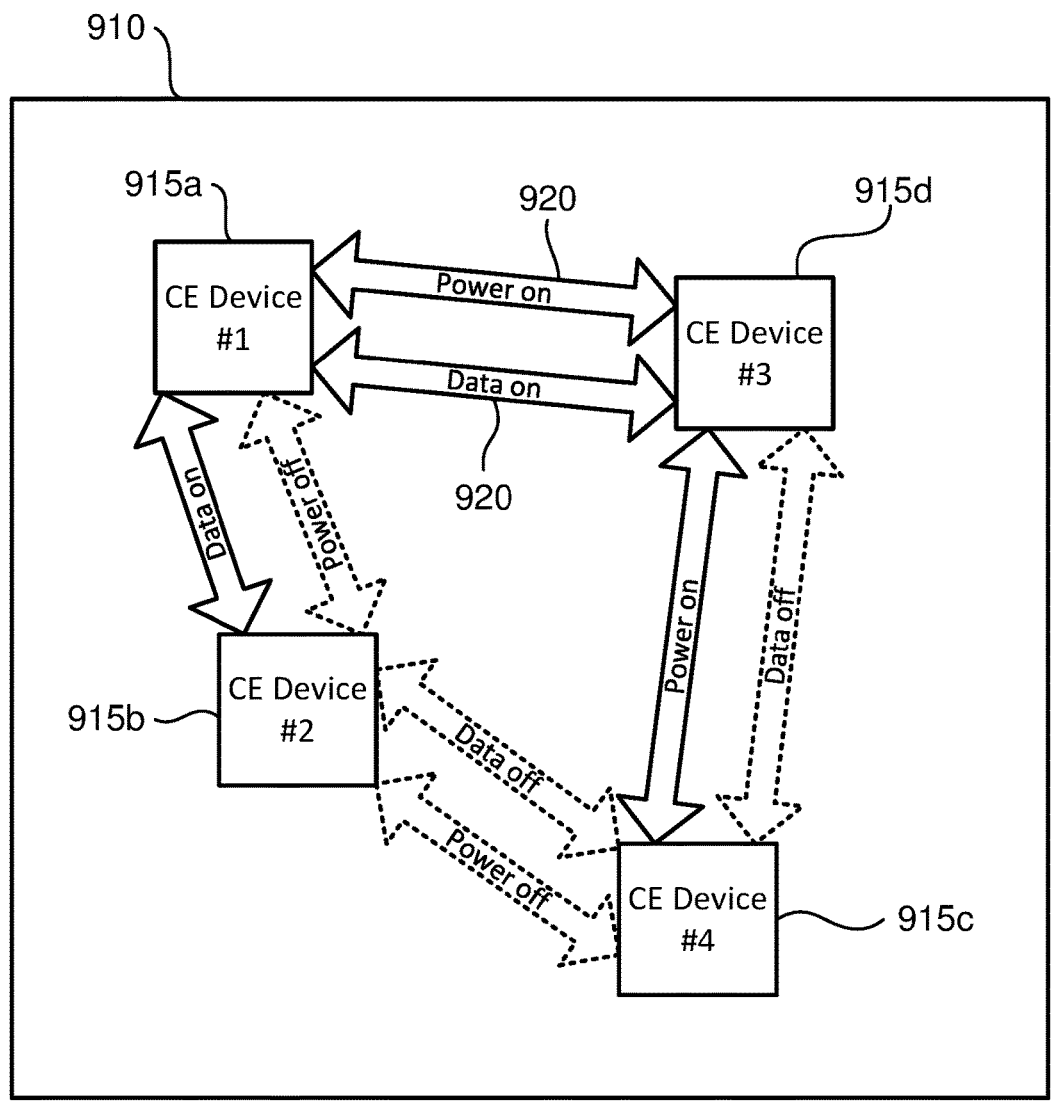
FIG. 9 shows an example graphical user interface suitable for configuring wireless power or data communication between two or more CE devices, in accordance with some embodiments.

FIG. 9 shows an example GUI 910 which can be displayed by one of CE devices (e.g., by a group owner) or another computing device configured to configure wireless power or data communication between CE devices. GUI 910 may display a "map" of identified or determined CE devices as icons 915a-915d. GUI 910 further shows connections 920 between CE devices (displayed as icons 915a-915d) characterizing both wireless power and wireless data transfer. GUI 910 can include control elements, such as simulated soft buttons or menu elements, to establish, manipulate, adjust, or remove one or more connections 920 to establish, manipulate, adjust, or remove wireless power and/or wireless data transfer between selected CE devices. For example, the user can authorize wireless power transfer between certain CE devices (displayed as icons 915a-915d) and can prohibit wireless power transfer between some other CE devices. Moreover, the user can authorize wireless data transfer between certain CE devices (displayed as icons 915a-915d) and can prohibit wireless data transfer between some other CE devices. In addition, GUI 910 can include control elements to control protocols or wireless power and/or data transfer parameters (e.g., to control data limits, limits of power charge levels, time to turn on and time to turn off, etc.). When a new CE device is discovered, identified, or determined, GUI 910 can display a new icon similar to icons 915a-915d to show the newly discovered CE device. Further, the user can use GUI 910 to establish wireless power or data transfer.

Figure 10:
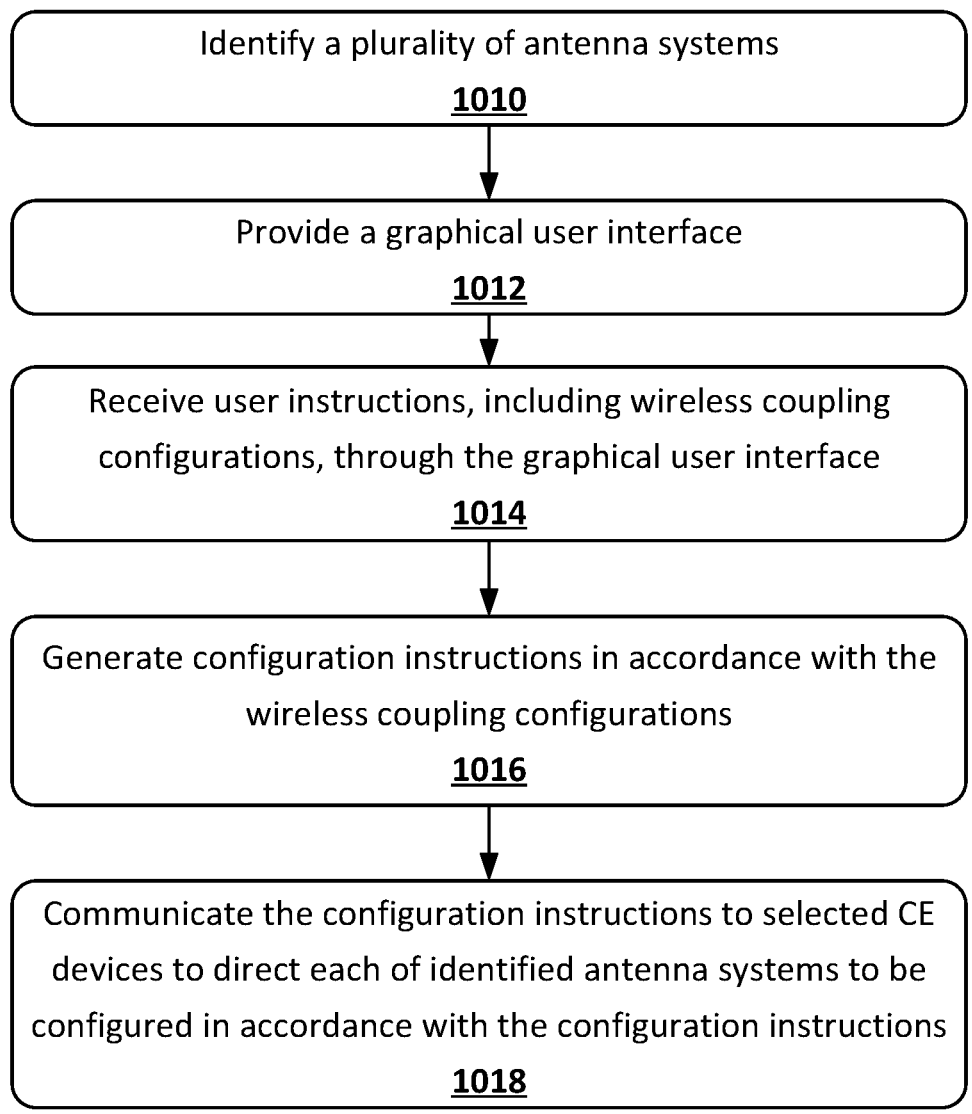
FIG. 10 shows a simplified flow diagram of an exemplary method for configuring wireless power and data transfer between CE devices, in accordance with some embodiments.

FIG. 10 shows another process flow diagram of a method 1000 for configuring wireless power and data transfer between CE devices, in accordance with some embodiments. Method 1000 may be performed by processing logic that may comprise hardware (e.g., decision-making logic, dedicated logic, programmable logic, ASIC, and microcode), software (such as software run on a general-purpose computer system or a dedicated machine), or a combination of both. In one example embodiment, the processing logic refers to a group owner, controller 318, a processor of CE device, a computing device, or a server. Notably, below recited steps of method 1000 may be implemented in an order different than described and shown in the figure. Moreover, method 1000 may have additional steps not shown herein, but which can be evident for those skilled in the art from the present disclosure. Method 1000 may also have fewer steps than outlined below and shown in FIG. 10.

Method 1000 commences at step 1010 when a plurality of antenna systems is identified. The plurality of antenna systems can include at least first antenna system 116 and second antenna system 116. At least the first antenna system 116 is cooperated with a first CE device (e.g., one of CE devices 130-134) and the second antenna system is cooperated with a separate second CE device (e.g., one of CE devices 130-134). As discussed above, each of the plurality of antenna systems 116 comprises a power transfer antenna and one or more communications antennas. The power transfer antenna is configured to enable wireless electrical power transfer between the power transfer antenna and at least one other power transfer antenna of another one of the plurality of antenna systems. Each of the one or more communications antennas is configured to enable wirelessly transmitting and receiving communications with at least one further communications antenna.

At step 1012, a graphical user interface is provided. The graphical user interface can be provided by a group owner (group controller), one of the CE devices, a separate CE device, or a server. The graphical user interface is configured to illustrate each of the identified antenna systems 116 and communicational relationships between each of the identified antenna systems (for example, as shown in FIG. 9).

At step 1014, user instructions are received through the graphical user interface. The user instructions correspond to at least two of the identified antenna systems 116. In certain embodiments, the user instructions can include wireless coupling configurations dictating how at least one of the identified antenna systems is to wirelessly transfer power to at least one another of the identified antenna systems or how at least one of the identified antenna systems is to wirelessly transfer data to at least one other of the identified antenna systems. It should be understood that the user instructions are capable of configuring the power antennas and the user instructions are capable of configuring the data antennas, such that the instructions do not need to include both each time they are received.

At step 1016, configuration instructions are generated in accordance with the wireless coupling configurations. The configuration instructions at least in part dictate which one or more of the plurality of antenna systems each antenna system is to directly communicate with and/or enable power transfer there between. Further, in some embodiments, the configuration instructions designate communications methods and/or protocols to be used (e.g., Wi-Fi, Bluetooth, via wireless USB, wireless Ethernet, power modulation (e.g., backscatter modulation), RFID communications or other such NFC, optical communication, HDMI, and/or other such communication methods or combinations of such protocols), which communications antenna of a plurality of communications antennas of an antenna system is to be used, a desired positioning and/or positional orientation of antenna system 116 and/or the CE device (which is typically dependent on an orientation of another antenna system to be communicated with), signal strength information defining a signal strength to be used in wirelessly transmitting relative to one or more communications antennas and/or communication protocols, encoding parameters, encryption parameters (e.g., encryption method, key, etc.), whether two antenna systems of a CE device are configured to operate as pass-through antenna systems, power transfer levels and/or rates, or other such information or combinations of such information.

At step 1018, the configuration instructions are communicated to selected CE devices to direct each of the identified antenna systems to be configured in accordance with the configuration instructions. Further, the configuration instructions can be permanently or temporarily stored in a memory of at least one of the CE devices, group owner, server, and/or other devices. Further, each of the identified antenna systems 116 is configured based at least in part on the received configuration instructions. After the identified antenna systems 116 are configured, there can be established wireless electrical power transfer between the power transfer antenna of one of the CE devices and the power transfer antenna of another CE device based at least in part on the configuration instructions. In addition, after the identified antenna systems 116 are configured, there can be provided wireless data transfer between at least one communications antenna of one of the CE devices and at least one communications antenna of another CE device based at least in part on the configuration instructions.

In certain embodiments, prior to wirelessly transferring data between the at least one communications antenna of one of the CE devices and the at least one communications antenna of another CE device, the data can be encrypted using any suitable encryption method such as a symmetric-key scheme or public-encryption scheme. After the data is wirelessly transferred between the at least one communications antenna of one of the CE devices and the at least one communications antenna of another CE device, the encrypted data can be decrypted or otherwise processed.

In additional embodiments, the configuration instructions can be retrieved from the memory anytime later on by any of the CE devices or by designated or predetermined devices with corresponding authorization. Further, the user can modify the manner of wireless power transfer and/or wireless data transfer using the same graphical user interface. Accordingly, modifying instructions corresponding to the at least two of the identified antenna systems can be received through the graphical user interface from the user. The modifying instructions can include modified wireless coupling configurations dictating how the at least one of the identified antenna systems is to wirelessly transfer power to at least one other of the identified antenna systems or how at least one of the identified antenna systems is to wirelessly transfer data to at least one other of the identified antenna systems. In this case, modified configuration instructions can be generated in accordance with the modified wireless coupling configurations. The modified configuration instructions are then communicated to the selected CE devices to direct each of the identified antenna systems to be configured in accordance with the modified configuration instructions.

Similarly, when there are changes in the near field wireless antenna caused by adding or removing one or more of CE devices, the selected CE devices can be automatically or manually reconfigured. For example, when at least one additional antenna system is identified, the user can provide, through the graphical user interface, additional user instructions corresponding to the at least one additional antenna system. The additional user instructions can include additional wireless coupling configurations dictating how the at least one additional antenna system is to wirelessly transfer power to at least one other of the identified antenna systems or how the at least one additional antenna system is to wirelessly transfer data to at least one other of the identified antenna systems. Further, additional configuration instructions are generated in accordance with the additional wireless coupling configurations, and then the additional configuration instructions are transmitted to the selected CE devices to direct each of the identified antenna systems to be configured in accordance with the additional configuration instructions.

In yet additional embodiments, it should be understood that two CE devices can initiate direct or indirect communication with one another when they appear within predetermined proximity from one another. In one example, the communication between a first power transfer antenna of a first antenna system and a second power transfer antenna of a second antenna system can be provided to acquire wireless coupling parameters corresponding to the one or more communications antennas of the second antenna system. The wireless coupling parameters may correspond to antenna systems and/or their potential coupling, association, and/or communication with other antenna systems. Further, the wireless coupling parameters can include one or more parameters that can be used in configuring a plurality of antenna systems to provide, establish, and/or maintain a network of the antenna systems allowing each antenna system to communicate with and/or implement a power transfer with one or more other antenna systems. The wireless coupling parameters can include substantially any relevant parameter that can be used in determining how to configure the network of antenna systems. For example, the wireless coupling parameters can include, but are not limited to, an identification of an antenna system, number of wireless communications antennas incorporated within an antenna system, number of power transfer antennas, positioning and/or orientation of communications and/or power antennas, communication protocols and/or methods supported, signal power and/or approximate wireless communication range or distance of each communications antenna and/or associated with each communication protocol supported, approximate wireless power transfer range of the power transfer antenna, an identification of one or more other antenna systems and/or communications antennas that are within wireless power transfer and/or wireless communication range of an antenna system, wireless signal strength between one or more other antenna systems and/or communications antennas that are within wireless power transfer and/or wireless communication range of an antenna system, wireless communication protocols and/or communication methods supported by another antenna system in communication with an antenna system, antenna positioning and/or orientation (e.g., orientation relative to a case or housing of the CE device, orientation relative to another antenna system, etc.) of the antenna systems, whether a CE device is connected to an external power source or operating over local power, battery storage levels, and other such parameters or combinations of such parameters. The wireless coupling parameters can be determined locally within an antenna system and/or received from a remote antenna system.

After the wireless coupling parameters are acquired, there can be performed authentication procedure to authenticate, allow, or enable wireless power or wireless data transfer between the first antenna system and the second antenna system based at least in part on the acquired wireless coupling parameters.

Further, in some embodiments the user may provide information and/or define some or all of the coupling configurations through a CE device that is not part of the near field wireless network. For example, the user may access a user interface through a smart phone that is remote from the near field wireless network yet in communication with one or more of the CE devices and/or antenna systems of the CE devices.

Another example of displaying the UI through a smartphone can be facilitated by the group controller generating the signal to display the UI, but the signal itself being displayed by another CE device, such as a television connected through an HDMI cable, or displaying a video signal that was transmitted wirelessly. Additionally, the UI can be implemented as a web application, where the UI is displayed by a web browser on a CE device that communicates to the group controller over a network.

Accordingly, in some embodiments, the coupling configurations are determined at a remote CE device that is remote from and not part of the near field wireless network, with the graphical user interface being generated and/or displayed on the remote CE device. The one or more configuration instructions can be wired and/or wirelessly communicated over a distributed network that is implemented beyond the bounds of the near field wireless network to a first antenna system that can be communicatively coupled with, and configured to communicate over, the distributed network.

Figure 5:
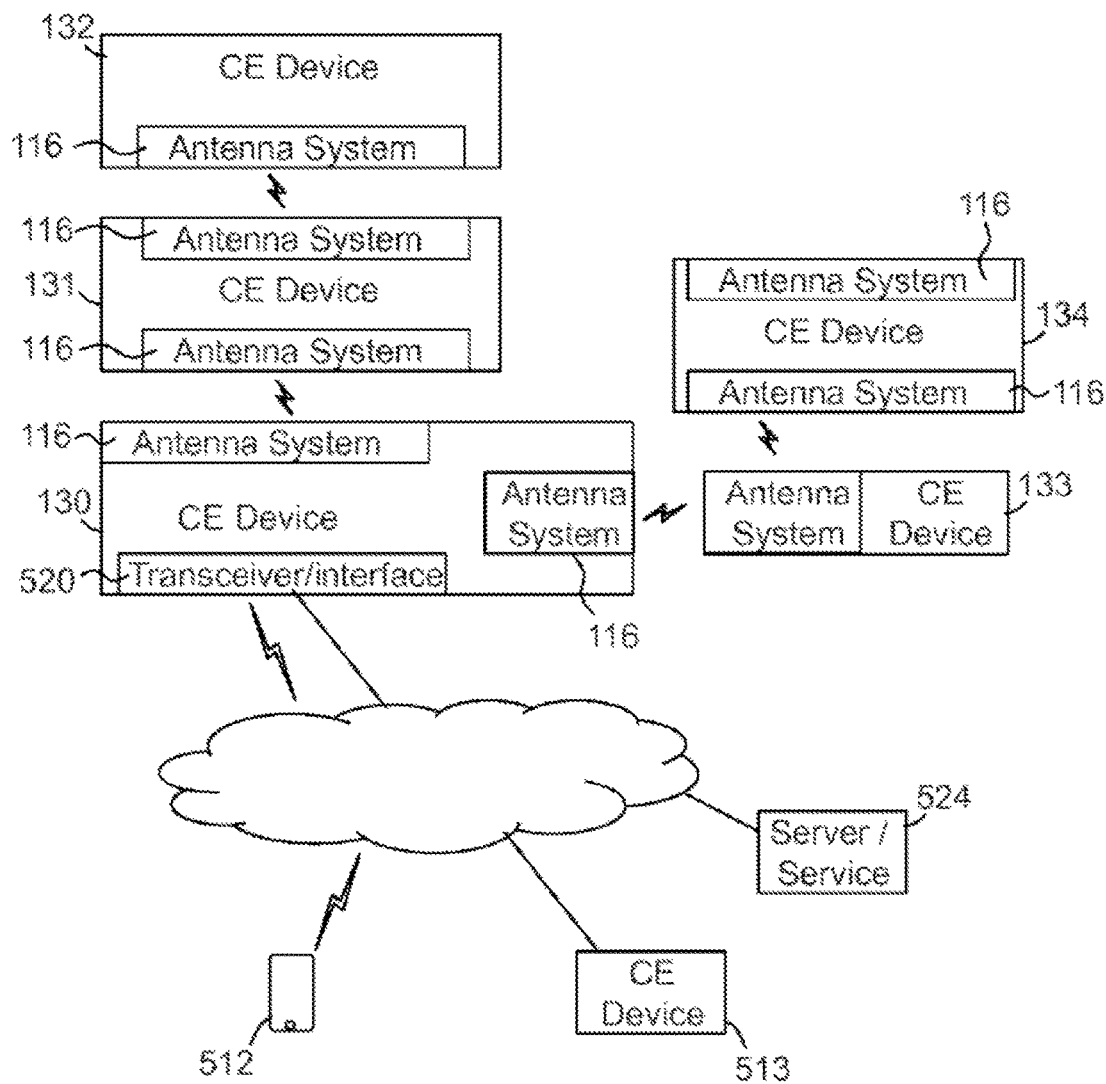
FIG. 5 shows a representation of multiple CE devices capable of forming a near field wireless network while one or more of the CE devices are coupled with one or more remote CE devices through a distributed network, in accordance with some embodiments.

FIG. 5 shows a representation of multiple CE devices 130-134 capable of forming a near field wireless network while one or more of CE devices 130-134 are coupled with one or more remote CE devices 512-513 through a distributed network 516, in accordance with some embodiments. Similar to FIG. 2A, CE devices 130-134 each include one or more antenna systems 116 configured to cooperatively couple with one or more other antenna systems. The cooperation and/or coupling between antenna systems can be configured to establish a near field wireless network to allow cooperative communication and/or power transfer between antenna systems 116, and thus the CE devices.

A user may access one or more of CE devices 130-134 through the distributed network 516 using one or more remote CE devices 512-513. For example, a user may communicate with first CE device 130 through the distributed network 516 and a transceiver and/or network interface 520 of the first CE device. Although not required, in some implementations, first CE device 130 may be designated as the group controller of the near field wireless network. As introduced above, the first remote CE device 512 may include a display that is configured to display a user interface that allows the user to obtain information about one or more of CE devices 130-134 and/or modify and/or define some or all of the coupling configurations, which may at least in part dictate with which one or more of the plurality of antenna systems each antenna system is to directly communicate.

Accordingly, some embodiments provide systems and methods to configure and/or modify configurations of antenna systems when multiple antenna systems are available in and/or are capable of forming a near-field wireless network. The configuration can be done remotely via a remote CE device (e.g., a remote mobile device like a cell phone, tablet, or the like). Typically, the remote CE device includes and/or couples with a display to provide the user with coupling parameters (e.g., wireless network capability, communication protocols, and/or other such information) and can access to the distributed network.

Additionally or alternatively, one or more servers and/or services 524 may act as an intermediary between a remote CE device 512 and one or more of the CE device 130-134 capable of forming the near field wireless network. Similarly, in some embodiments, the server or service 524 may provide the user interface to the remote CE device and/or interact with an application operating on the CE device to populate a user interface and/or receive commands through the user's interaction with the user interface.

The remote CE devices 512-513 can be substantially any relevant CE device capable of communicating over the distributed network with one or more of the CE device 130-134 and/or the service 524. For example, the remote CE device can be a smart phone, laptop, tablet, computer, smart television, home theater receiver, set-top-box, game console or other such device. Any of these devices can act as a controller. Similarly, the remote server and/or service 524 can be implemented by substantially any relevant service, such as but not limited to a cellular network provider, a CE device manufacturer, a local area network router manufacturer, a home personal computer of a user, or other such service.

Figure 6:
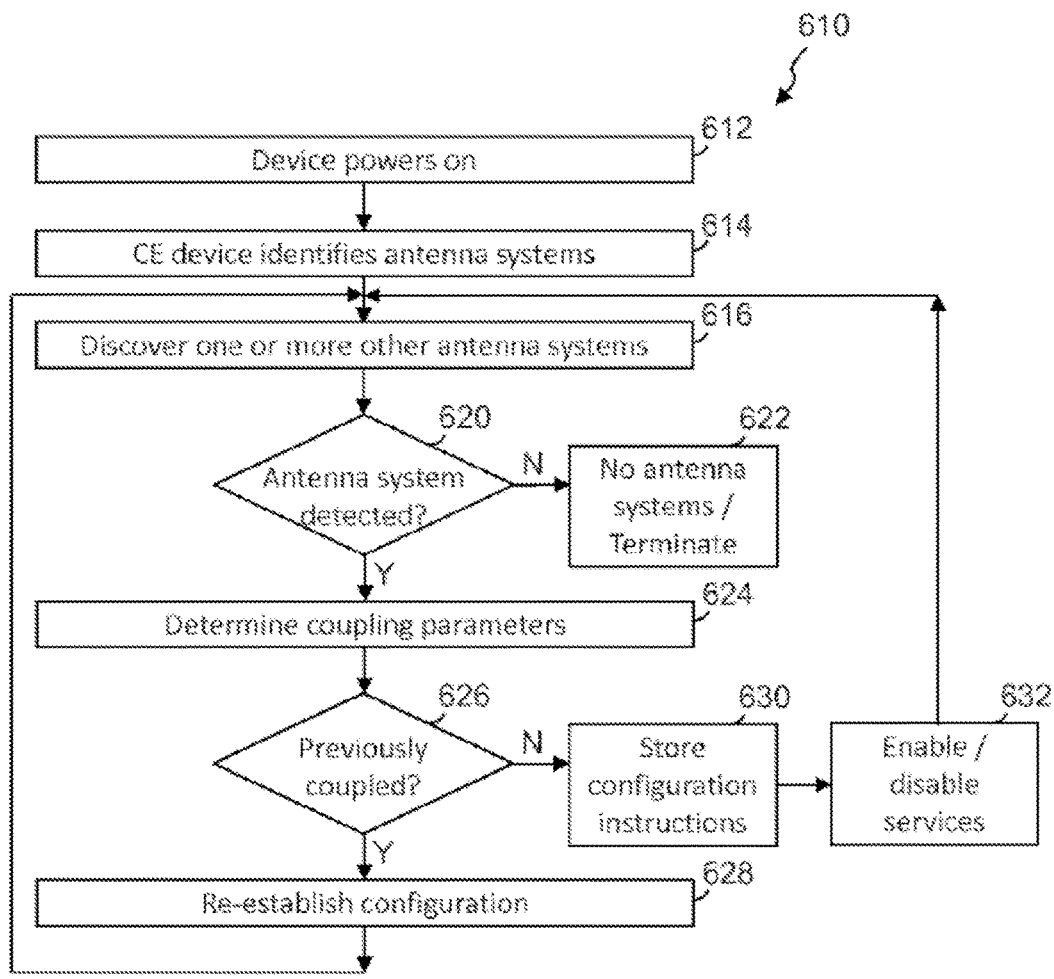
FIG. 6 depicts a simplified flow diagram of an exemplary process of discovering one or more antenna systems, in accordance with some embodiments.

FIG. 6 depicts a simplified flow diagram of an exemplary process 610 of discovering one or more antenna systems 116, in accordance with some embodiments. Process 610 may be performed by processing logic that may comprise hardware (e.g., decision-making logic, dedicated logic, programmable logic, ASIC, and microcode), software (such as software run on a general-purpose computer system or a dedicated machine), or a combination of both. In one example embodiment, the processing logic refers to a group owner, controller 318, a processor of CE device, a computing device, or a server. Notably, below recited steps of process 610 may be implemented in an order different than described and shown in the figure. Moreover, process 610 may have additional steps not shown herein, but which can be evident for those skilled in the art from the present disclosure. Process 610 may also have fewer steps than outlined below and shown in FIG. 6.

In step 612, the process is started. For example, a CE device (e.g., CE device 130) and/or an antenna system 116 is powered on, a user activates the antenna system discovery process, a predefined amount of time expires, or the like. In step 614, the CE device 130 determines a number of antenna systems 116 of the CE device and/or capable of communicating with one or more CE devices. In some embodiments, this information is known and stored locally, while in other embodiments, the CE device evaluates system resources to detect antenna systems. In still other embodiments, antenna systems within the CE device may issue a notification to a controller of the CE device and/or the another antenna system.

In step 616, each antenna system 116 of a CE device is activated to discover one or more other antenna systems 116 with which the antenna system is in range and/or with which the antenna system may potentially couple. The discovery process may include sending one or more predefined communications from one or more of the antennas of the antenna systems, following one or more predefined protocol discovery processes (e.g. a PHY discovery process, magnetic induction field discovery process, etc.), and/or other such discovery processes or combinations of such discovery processes.

For example, in some implementations, one or more communications are initiated through power modulation between power transfer antennas of two antenna systems, a predefined communication protocol can be used from one or more communications antennas, or other such communications may be implemented and/or a combination of such communications may be implemented. The communications can be configured, for example, to acquire wireless coupling parameters corresponding to the one or more communications antennas of one or both antenna systems. The discovery communication may be an initial communication, and once coupling is established, subsequent communications with one or more other antennas may be employed using one or more protocols determined through the initial communication (e.g., done through the power transfer antenna). Further, the discovery process or processes may limit discovery to those antenna systems that are external to the CE device.

In step 620, it is determined whether one or more antenna systems are detected. In those instances where there are no antenna systems detected and/or no additional antenna systems yet to be identified, the process terminates at step 622. For example, the process 610 may terminate when the CE device 130 is not positioned near another CE device that is capable of communicating with antenna system 116 of the CE device.

When a second antenna system is detected, the process advances to step 624, where coupling parameters and/or other such information are determined for the detected second antenna system. Again, the coupling and/or coupling parameters and/or other information can include determining the communication and/or power transfer capabilities of the second antenna system, services and/or functionality of the corresponding separate CE device, and/or other such coupling configurations and/or information. For example, some embodiments perform some or all of a link layer discovery protocol process, UPnP discovery, or the like of at least the CE device.

Some embodiments include step 626 where it is determined whether first CE device 130, an antenna system 116 of the first CE device, or another CE device of the near field wireless network previously coupled with the second CE device and/or the antenna system of the CE device. In those instances where the CE device and/or antenna system is recognized, the process may advance to step 628 to re-establish the same or a similar configuration that was previously established with the second CE device. This can improve efficiency and/or utilize optimum configurations that were previously determined. For example, a default configuration may be established when two antenna systems are wirelessly coupled based on a previous evaluation of the available antenna systems and/or antennas of two or more antenna systems. As such, the previously established default configuration can be implemented in step 628 between two antenna systems. Again, this default configuration may be based on a determined optimum coupling. In some implementations, the previous configuration and/or default configuration may be stored in one or more of the antenna systems, a group controller, a remote service 524, a remote CE device 512, or the like. For example, a matrix may be stored in an antenna system controller of each antenna system in response to receiving configuration instructions.

Similarly, in some embodiments, previous parameters and/or settings are remembered for a configuration and when the orientation and/or configuration of antenna systems changes to a previous orientation and/or configuration, then the group of antenna systems and/or CE devices can shift to the remembered settings and/or default to using the last settings that were in use when the antenna systems were in the same configuration. Additionally or alternatively, there could be a plurality of previously defined coupling configurations and/or settings, which may have been saved and/or named, that could be chosen to apply to the current orientation and/or configuration. In some embodiments, the previously saved and/or default configurations may specify orientations of antenna systems and/or CE devices in lining up one or more antennas available on one side of the communications with antennas available on the other side of the communications. Further, the settings may designate what signals will be sent over each communication channel.

As another example, the group controller and/or antenna system may recognize that there is an HDMI signal source available through a first CE device, that a second CE device is configured to use an HDMI signal, and that there are antennas available in antenna systems of each of the first and second CE device configured to wirelessly communicate an HDMI signal. Accordingly, the antenna systems and/or group controller might default to configure the corresponding antenna systems of the two CE devices to communicate the HDMI signal. Further, in some instances, this configuration may occur through the antenna systems without the need to be explicitly configured to do so.

Further, some embodiments may implement step 630 when the second antenna system has not been previously configured and/or associated with the first antenna system or another antenna system of the near field wireless network. In step 630, configuration instructions can be stored, for example, in a matrix, for subsequent use upon reconfiguring the near field network and/or a change of the near field wireless network (e.g., the CE device having the second antenna system is removed from the near field wireless network and later incorporated back into the near field wireless network). In step 632, appropriate services within first CE device 130 and/or the antenna system of the first CE device are enabled and/or disabled based on the coupling and/or coupling parameters and/or other information (e.g., functionality of the CE device), such as the information obtained in step 624.

Process 610 or portions of the process can repeat for each antenna system detected and/or that might be incorporated into the near field wireless network. For example, following steps 628 or 632, the process may return to step 616 to initiate the discovery process in attempts to detect one or more further antenna systems.

Figure 7:
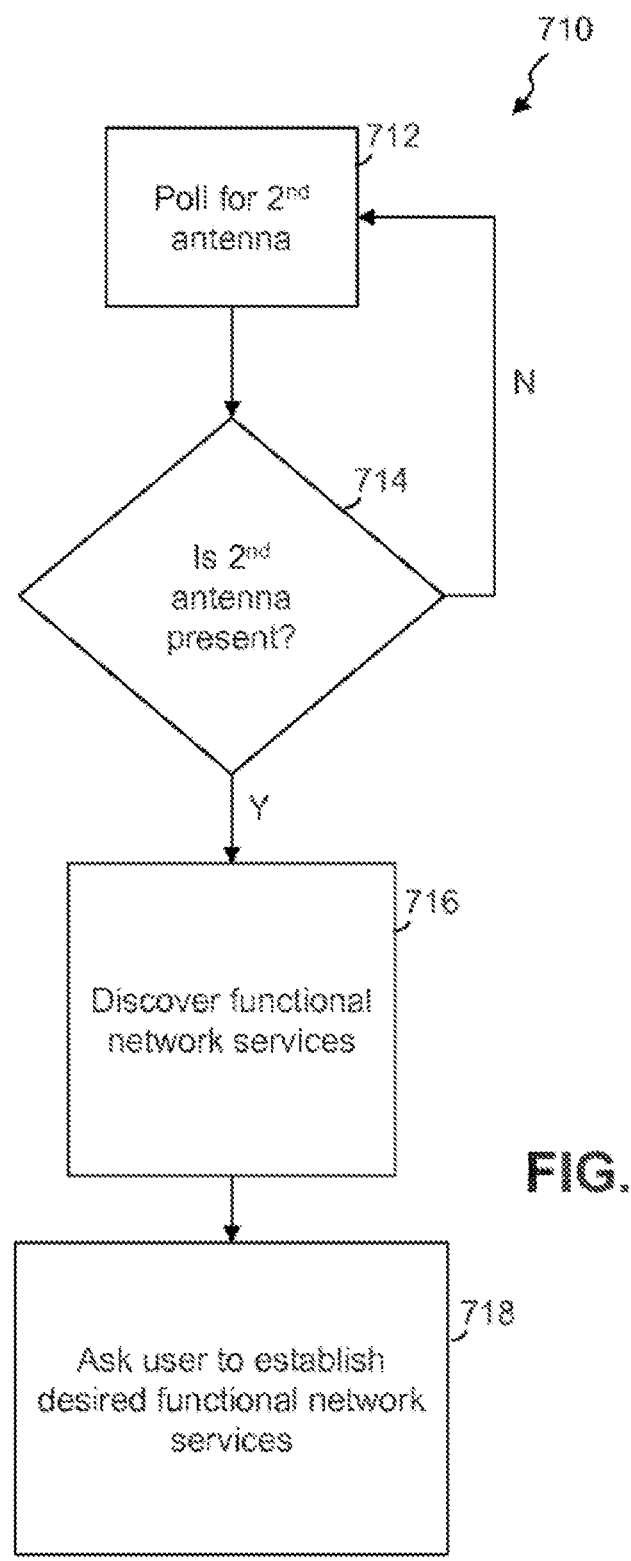
FIG. 7 depicts a simplified flow diagram of an exemplary process of discovering one or more antenna systems and/or CE devices, in accordance with some embodiments.

FIG. 7 depicts a simplified flow diagram of an exemplary process 710 of discovering one or more antenna systems and/or CE devices, in accordance with some embodiments. The process 710 may be utilized to implement one or more steps of the process 610, in some embodiments. In step 712, an antenna system wirelessly polls for a separate second antenna system. The polling can be substantially any polling. For example, the polling may include issuing one or more predefined communications through one or more communications antennas and/or the power antenna of the antenna system in accordance with one or more communication protocols and determining whether a corresponding predefined response is received.

In step 714, it is determined whether a second antenna system is detected. When no separate antenna system is detected, the process may repeat step 712 one or more times. Again, the repeating may include repeating a previous communication or issuing a different communication in accordance with a different communication protocol through one or more antennas of the antenna system. When a separate antenna system is detected, step 716 is entered to discover the functional network services. For example, PHY layer detection and/or a Link Layer protocol (e.g., UPnP) can be implemented to discover some or all the functional network services available (e.g., power sharing functionality, data sharing functionality, communications functionality, etc.). Some embodiments may include step 718 where a user is asked to establish one or more desired functional network services. For example, once services are known, the user can be asked to authorize which services are to be activated.

The discovery of another antenna system and/or the configuration of the near field wireless network may be activated by a user, may be initiated in response to a power up, may be triggered based on a schedule or expiration of a predefined period of time, or the like. For example, a user may activate an application on a CE device to initiate the antenna system discovery. As another example, the CE device may activate the antenna system discovery and/or ask the user whether it is authorized to perform an antenna system discovery. For example, an antenna system would not exchange information and/or communicate with another antenna system without permission from the user (e.g., user presses button to start discovery, user presses button, while second CE device is in "auto mode," both devices are in "auto mode," etc.). Similarly, the ability to establish a wireless connection with another antenna system of another CE device may be restricted based on a service authorization (e.g., there may be a service that the user needs to pay for to take advantage of this capability). As such, an antenna system may need authorization (e.g., from a service provider) before allowing the discovery and/or linking with another antenna system. Additionally or alternatively, antenna systems that were previously connected may connect automatically as part of the discovery process.

As described above, some embodiments identify one or more previous coupling configuration settings that were previously stored. The previous coupling configuration setting can define one or more prior coupling configurations, and the configuration setting is typically associated with each of multiple antenna systems based on prior wireless cooperation between at least the multiple antenna systems. As such, the configuration instructions can comprise the previous coupling configuration setting corresponding to the one or more of the prior wireless coupling configurations, which can direct at least the multiple antenna systems (e.g., first, second, and third antenna systems) to communicatively cooperate relative to each other in accordance with the previous coupling configurations setting. Additionally, in some implementations, the previous coupling configuration setting further defines an orientation and/or position of a first antenna system relative to an orientation and/or position of one or more of the multiple antenna systems.

For example, in may be determined from the wireless coupling parameters that a first antenna system, a second antenna system, and a third antenna system are in a first orientation relative to each other. It may further be determined that the first antenna system, the second antenna system, and the third antenna system had in the past been positioned in a previous orientation that is substantially the same as the first orientation. Based in part on this identified previous orientation, one or more prior wireless coupling configurations previously stored and associated with the previous orientation may be identified. As such, one or more configuration instructions can comprise one or more configuration instructions directing at least the first antenna system, the second antenna system, and the third antenna system to communicatively cooperate relative to each other in accordance with the prior coupling configurations.

Figure 8:
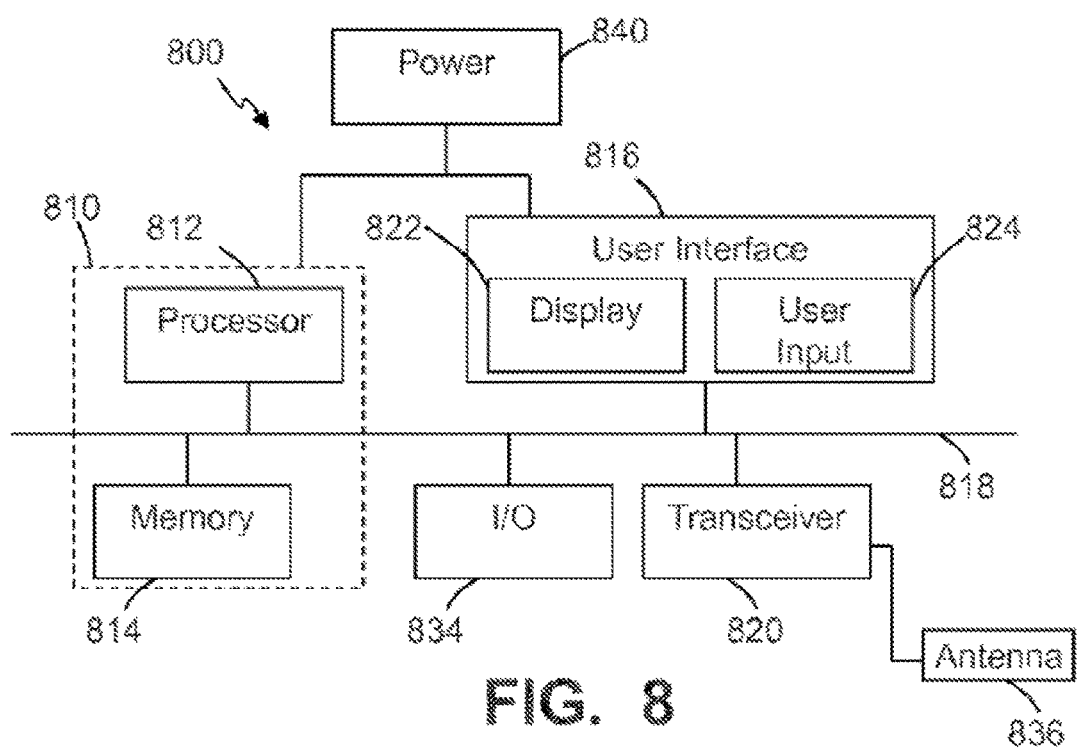
FIG. 8 illustrates an exemplary system for use in implementing methods, techniques, devices, apparatuses, systems, servers, sources and the like in providing user interactive virtual environments, in accordance with some embodiments.

The methods, techniques, systems, devices, services, servers, sources and the like described herein may be utilized, implemented and/or run on many different types of devices and/or systems. Referring to FIG. 8, there is illustrated a system 800 that may be used for any such implementations, in accordance with some embodiments. One or more components of the system 800 may be used for implementing any system, apparatus or device mentioned above or below, or parts of such systems, apparatuses or devices, such as for example any of the above or below mentioned CE devices 112, 114, 130-134, 512-513, controller 318, antenna systems 116, 310, server 524, CE functional circuitry, user interface, wireless power distribution circuitry and the like. However, the use of the system 800 or any portion thereof is certainly not required.

By way of example, the system 800 may comprise a controller or processor module 812, memory 814, and one or more communication links, paths, buses or the like 818. Some embodiments include a user interface 816. A power source or supply 840 may be included or coupled with the system 800. The controller 812 can be implemented through one or more processors, microprocessors, central processing unit, logic, local digital storage, firmware and/or other control hardware and/or software, and may be used to execute or assist in executing the steps of the processes, methods, and techniques described herein, and control various communications, programs, content, listings, services, interfaces, and the like. Further, in some embodiments, the controller 812 can be part of a control system 810 and/or implemented through one or more processors with access to one or more memories 814. The user interface 816 can allow a user to interact with the system 800 and receive information through the system. In some instances, the user interface 816 includes a display 822 and/or one or more user inputs 824, such as a keyboard, mouse, track ball, remote control, buttons, touch screen, and the like, which can be part of, or wired or wirelessly coupled with, the system 800.

In some embodiments, the system 800 further includes one or more communication interfaces, ports, transceivers 820 and the like allowing the system 800 to communication over a communication bus, a distributed network, a local network, the Internet, communication link 818, other networks or communication channels with other devices and/or other such communications or combinations thereof. Further, the transceiver 820 can be configured for wired, wireless, optical, fiber optical cable, or other such coupling configurations or combinations of such communications. The system 800 further includes one or more antennas 836, and typically one or more communications antennas and one or more power transfer antennas. One or more inputs and/or outputs (I/O) 834 may be provided, such as power and/or communication ports, audio adaptor ports, and the like.

The system 800 comprises an example of a control and/or processor-based system with the controller 812. Again, the controller 812 can be implemented through one or more processors, controllers, central processing units, logic, software and the like. Further, in some implementations, the controller 812 may provide multiprocessor functionality.

The memory 814, which can be accessed by the controller 812, typically includes one or more processor readable and/or computer readable media accessed by at least the controller 812, and can include volatile and/or nonvolatile media, such as RAM, ROM, EEPROM, flash memory, and/or other memory technology. Further, the memory 814 is shown as internal to the system 810; however, the memory 814 can be internal, external, or a combination of internal and external memory. Similarly, some or all of the memory 814 can be internal, external or a combination of internal and external memory of the controller 812. The external memory can be substantially any relevant memory such as, but not limited to, one or more of flash memory secure digital (SD) card, USB stick or drive, other memory cards, hard drive, and other such memory or combinations of such memory. The memory 814 can store code, software, executables, coupling, and/or communication parameters, coupling configurations, identifiers, scripts, data, content, multimedia content, programming, programs, log or history data, user information, and the like.

One or more of the embodiments, methods, processes, approaches, and/or techniques described above or below may be implemented in one or more computer programs executable by a processor-based system. By way of example, such a processor based system may comprise the processor based system 800, a cellular phone (e.g., a smart phone), a tablet, a laptop, a computer, a set-to-box, an television, an IP enabled television, a Blu-ray player, an IP enabled Blu-ray player, a DVD player, entertainment system, gaming console, graphics workstation, tablet, and the like. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes, or techniques to enable the configuration of the wireless antenna systems and/or near field wireless network, wireless communication, wireless power transfer, and the like. In some embodiments, program code modules, loops, subroutines, and the like within the computer program may be used for executing various steps and/or features of the above or below described methods, processes, and/or techniques. As another example, such computer programs may be used for implementing any type of tool or similar utility that uses any one or more of the above or below described embodiments, methods, processes, approaches, and/or techniques. In some embodiments, program code modules, loops, subroutines, and the like within the computer program may be used for executing various steps and/or features of the above or below described methods, processes, and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, with the one or more computer programs configured to cause a computer and/or processor based system to execute steps comprising: identifying a plurality of near field wireless antenna systems including a first antenna system, a second antenna system, and a third antenna system, wherein at least the first antenna system is cooperated with a first CE device and the second antenna system is cooperated with a separate second CE device, wherein each of the plurality of antenna systems comprises a power transfer antenna and one or more communications antennas, wherein the power transfer antenna is configured to enable wireless electrical power transfer between the power transfer antenna and at least one other power transfer antenna of another one of the plurality of antenna systems, and wherein each of the one or more communications antennas is configured to enable wirelessly transmitting and receiving communications with at least one further communications antenna over distances consistent with those to achieve wireless electrical power transfer through the power transfer antenna; receiving wireless coupling parameters corresponding to each of the plurality of antenna systems; determining, based on the wireless coupling parameters, wireless coupling configurations corresponding to at least the first, second, and third antenna systems, wherein the wireless coupling configurations dictate with which one or more of the plurality of antenna systems each of at least the first, second, and third antenna systems of the plurality of antenna systems is to directly communicate; and initiating a communication of one or more configuration instructions directing each of the plurality of antenna systems to be configured in accordance with the determined wireless coupling configurations.

As described above, in some embodiments, an antenna system 116 and/or a CE device (e.g., second CE device 131) operates as a group and/or near field network controller. Typically, the CE device 131 includes a display to display relevant coupling parameters, coupling configurations, configuration instructions, and/or other such information. Further, in many embodiments, the user can interact with a user interface displayed on the second CE device to obtain information about the near field network, specify coupling configurations for the near field network, and/or modify the configuration of the network. For example, some embodiments provide the user with a table, mapping, and/or pictorial representations of some or all the near field network. In some embodiments, the user can designate a group controller, and the group controller can be selected through link layer protocol or other such selection. The group controller typically receives the coupling parameters. In some implementations, the coupling parameters are tables and/or matrices from the other antenna systems and/or CE devices. Using the coupling parameters, the group controller can configure an overall system mapping of how the antenna systems are to connect to one another. In some instances, the coupling configurations further define the services that are enabled.

In some embodiments, the group controller can be implemented through a remote CE device that is in communication via a network (e.g., LAN, WAN, WLAN, etc.) with one or more of the antenna systems and/or CE devices of the near field network. The remote CE device, in some embodiments, implements an application that a user can use to manage (create, edit, copy, transfer, recall, etc.) the near field configuration, predefined configurations, and the like. Further, one or more network configurations can be stored locally on the one or more of the antenna systems, CE device or remote CE device, or on a remote server 524. Typically, a group controller can be released to another CE device or antenna system (e.g., in response to a change of CE devices to the network) and restored to the first CE device. Further, some embodiments maintain stored and/or default configurations. In some instances, an antenna system may have default operating conditions and/or a default configuration. Similarly, a group controller may maintain previous and/or default configurations for subsequent utilization. Still further, some antenna systems and/or CE devices utilize authentication procedures. For example, an antenna system and/or CE device requests authentication before some information, data, and/or content is communicated (e.g., before encrypted data can be exchanged or passed through). Those antenna systems and/or CE devices that do not need to authenticate typically start to exchange or pass data after associating and/or coupling with another antenna system. The authentication procedures can be based on exchange and processing of wireless coupling parameters.

As described above, some embodiments are configured to utilize one or more CE devices that include two or more antenna systems that allow it to wirelessly and inductively couple with two or more different CE devices. As such, in accordance with some embodiments, wireless power transfer and/or wireless communication may be daisy chained between multiple CE devices (e.g., between the first and third CE devices 130, 132 through second CE device 131). Further, second CE device 131 can be configured to independently communicate with the first and/or third CE devices, and/or implement a wireless power transfer to or from one or both of the first and third CE devices. Power transfer and/or communications may be unidirectional or bidirectional depending on an intended operation.

In some implementations, an antenna system allows one or more of the CE devices to operate without any externally accessible communications ports and/or power cords. Instead, power and communications are received and/or transmitted wirelessly. For example, referring to FIG. 1B, second CE device 131 may receive all operation power from one or both of first CE device 130 and/or third CE device 132. Similarly, the antenna systems allow second CE device 131 to externally communicate with one or more other CE devices without the need for cable, fiber optic, or other such wired communications. For example, second CE device 131 may be a Blu-ray player communicatively coupled with a television (e.g., third CE device 132) to wirelessly communicate multimedia content from a Blu-ray disc to the television for playback without the need for cable connections or external ports. Similarly, second CE device 131 may receive power to operate from the first and/or third CE devices. As such, in some implementations, the CE device can be designed and assembled without any external ports or connectors, and one or more antenna systems can be incorporated that allow the CE device to acquire power and communicate with one or more other CE devices. In some embodiments, CE devices and/or one or more communications antennas of one or more antenna systems in a CE device can operate without externally accessible communication ports, and in some instances, all communications with the CE device in which the antenna system is mounted are through the one or more communications antennas of one or more antenna systems.

Still further, in some embodiments, the antenna system can be incorporated into each end of a cable. The antenna systems of the cable could be configured in a pass-through mode to allow the connectors to be chained. Similarly, such a cable could be used with stacked CE devices, for example, where someone wanted to locate devices on a short shelf with one or more devices being located beside other devices instead of on top of them and the devices could be connected with the cable. It is noted, however, that the antenna systems do not have to be positioned one on top of the other. In many implementations, the antenna systems of two CE devices can be arranged in the CE devices to allow the two CE devices to be placed adjacent to each other instead of stacked.

Some embodiments provide methods of configuring a near field wireless network, comprising: identifying a plurality of near field wireless antenna systems including a first antenna system, a second antenna system, and a third antenna system, wherein at least the first antenna system is cooperated with a first CE device and the second antenna system is cooperated with a separate second CE device, wherein each of the plurality of antenna systems comprises a power transfer antenna and one or more communications antennas, wherein the power transfer antenna is configured to enable wireless electrical power transfer between the power transfer antenna and at least one other power transfer antenna of another one of the plurality of antenna systems, and wherein each of the one or more communications antennas is configured to enable wirelessly transmitting and receiving communications with at least one further communications antenna over distances consistent with those to achieve wireless electrical power transfer through the power transfer antenna; receiving wireless coupling parameters corresponding to each of the plurality of antenna systems; determining, based on the wireless coupling parameters, wireless coupling configurations corresponding to at least the first, second, and third antenna systems, wherein the wireless coupling configurations dictate with which one or more of the plurality of antenna systems each of at least the first, second, and third antenna systems of the plurality of antenna systems is to directly communicate; and initiating a communication of one or more configuration instructions directing each of the plurality of antenna systems to be configured in accordance with the determined wireless coupling configurations.

Thus, methods and systems for configuring wireless power or data transfer have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for configuring wireless power and data transfer between consumer electronic (CE) devices, the method comprising:
identifying a plurality of antenna systems including at least a first antenna system and a second antenna system, wherein at least the first antenna system is cooperated with a first CE device and the second antenna system is cooperated with a separate second CE device, wherein each of the plurality of antenna systems comprises a power transfer antenna and one or more communications antennas, wherein the power transfer antenna is configured to enable wireless electrical power transfer between the power transfer antenna and at least one other power transfer antenna of another one of the plurality of antenna systems;
wherein each of the one or more communications antennas is configured to enable wirelessly transmitting and receiving communications with at least one further communications antenna;
providing a graphical user interface, wherein the graphical user interface is configured to illustrate each of the identified plurality of antenna systems and communicational relationships between each of the identified plurality of antenna systems, wherein the graphical user interface is further configured to enable a user to interact with the graphical user interface;
receiving, through the graphical user interface, user instructions corresponding to at least two of the identified plurality of antenna systems, wherein the user instructions include wireless coupling configurations dictating how at least one of the identified plurality of antenna systems is to wirelessly transfer power to at least one other of the identified plurality of antenna systems or how at least one of the identified plurality of antenna systems is to wirelessly transfer data to at least one other of the identified plurality of antenna systems;
generating configuration instructions in accordance with the wireless coupling configurations; and
causing communication of the configuration instructions to selected CE devices to direct each of the identified plurality of antenna systems to be configured in accordance with the configuration instructions.

2. The method of claim 1, further comprising:
storing the configuration instructions in a memory of at least one of the CE devices; and
configuring each of the identified antenna systems based at least in part on the configuration instructions.

3. The method of claim 2, further comprising:
establishing wireless electrical power transfer between the power transfer antenna of one of the CE devices and the power transfer antenna of another CE device based at least in part on the configuration instructions; and providing wireless data transfer between at least one communications antenna of one of the CE devices and at least one communications antenna of another CE device based at least in part on the configuration instructions.

4. The method of claim 2, further comprising:

encrypting data prior to wireless transfer between the at least one communications antenna of one of the CE devices and the at least one communications antenna of another CE device; and decrypting the data after the data is wirelessly transferred between the at least one communications antenna of one of the CE devices and the at least one communications antenna of another CE device.

5. The method of claim 2, further comprising:

retrieving the configuration instructions from the memory;

receiving, through the graphical user interface, modified instructions corresponding to the at least two of the identified antenna systems, wherein the modified instructions include modified wireless coupling configurations dictating how the at least one of the identified antenna systems is to wirelessly transfer power to at least one other of the identified antenna systems or how at least one of the identified antenna systems is to wirelessly transfer data to at least one other of the identified antenna systems;

generating modified configuration instructions in accordance with the modified wireless coupling configurations; and causing communication of the modified configuration instructions to the selected CE devices to direct each of the identified antenna systems to be configured in accordance with the modified configuration instructions.

6. The method of claim 2, further comprising:

identifying, after configuring each of the identified antenna systems, at least one additional antenna system, wherein the at least one additional antenna system is cooperated with at least one additional CE device, respectively, wherein the at least one additional antenna system comprises a power transfer antenna and one or more communications antennas, wherein the power transfer antenna of the at least one additional antenna system is configured to enable wireless electrical power transfer between the power transfer antenna and at least one other power transfer antenna of another one of the plurality of antenna systems; and wherein each of the one or more communications antennas of the at least one additional antenna system is configured to enable wirelessly transmitting and receiving communications with at least one further communications antenna;

receiving, through the graphical user interface, additional user instructions corresponding to the at least one additional antenna system, wherein the additional user instructions include additional wireless coupling configurations dictating how the at least one additional antenna system is to wirelessly transfer power to at least one other of the identified antenna systems or how the at least one additional antenna system is to wirelessly transfer data to at least one other of the identified antenna systems;

generating additional configuration instructions in accordance with the additional wireless coupling configurations; and causing communication of the additional configuration instructions to selected CE devices to direct each of the identified antenna systems to be configured in accordance with the additional configuration instructions.

7. The method of claim 1, further comprising:

initiating, after identifying the plurality of antenna systems, a communication between a first power transfer antenna of the first antenna system and a second power transfer antenna of the second antenna system to acquire wireless coupling parameters corresponding to the one or more communications antennas of the second antenna system.

8. The method of claim 7, further comprising:

authenticating wireless power or wireless data transfer between the first antenna system and the second antenna system based at least in part on the acquired wireless coupling parameters.

9. The method of claim 1, wherein the wireless coupling configurations designate a wireless data transfer protocol to be used for wireless data transfer between the first antenna system and the second antenna system.

10. The method of claim 1, further comprising:

establishing the first antenna system of the first CE device as a group controller of a near field wireless network and over each of the plurality of antenna systems, wherein the graphical user interface is provided by the group controller only.

11. A system for use in configuring wireless power and data transfer between CE devices, the apparatus comprising:

memory storing executable code; and one or more processors configured to execute at least some of the executable code, such that the processor when implementing the executable code is configured to:

identify a plurality of antenna systems including at least a first antenna system and a second antenna system, wherein at least the first antenna system is cooperated with a first CE device and the second antenna system is cooperated with a separate second CE device, wherein each of the plurality of antenna systems comprises a power transfer antenna and one or more communications antennas, wherein the power transfer antenna is configured to enable wireless electrical power transfer between the power transfer antenna and at least one other power transfer antenna of another one of the plurality of antenna systems; and wherein each of the one or more communications antennas is configured to enable wirelessly transmitting and receiving communications with at least one further communications antenna provide a graphical user interface, wherein the graphical user interface is configured to illustrate each of the identified antenna systems and communicational relationships between each of the identified antenna systems, wherein the graphical user interface is further configured to enable a user to interact with the graphical user interface;

receive, through the graphical user interface, user instructions corresponding to at least two of the identified antenna systems, wherein the user instructions include wireless coupling configurations dictating how at least one of the identified antenna systems is to wirelessly transfer power to at least one another of the identified antenna systems or how at least one of the identified antenna systems is to wirelessly transfer data to at least one another of the identified antenna systems;
generate configuration instructions in accordance with the wireless coupling configurations; and
cause communication of the configuration instructions to selected CE devices to direct each of the identified antenna systems to be configured in accordance with the configuration instructions.

12. The system of claim 11, wherein the one or more processors, when implementing the executable code, are further configured to:
store the configuration instructions in a memory of at least one of the CE devices; and
configure each of the identified antenna systems based at least in part on the configuration instructions.

13. The system of claim 12, wherein the one or more processors, when implementing the executable code, are further configured to:
establish wireless electrical power transfer between the power transfer antenna of one of the CE devices and the power transfer antenna of another CE device based at least in part on the configuration instructions; and
provide wireless data transfer between at least one communications antenna of one of the CE devices and at least one communications antenna of another CE device based at least in part on the configuration instructions.

14. The system of claim 12, wherein the one or more processors, when implementing the executable code, are further configured to:
cause encrypting of data prior to wireless transferring between the at least one communications antenna of one of the CE devices and the at least one communications antenna of another CE device; and
cause decrypting of the data after the data is wirelessly transferred between the at least one communications antenna of one of the CE devices and the at least one communications antenna of another CE device.

15. The system of claim 12, wherein the one or more processors, when implementing the executable code, are further configured to:
retrieve the configuration instructions from the memory;
receive, through the graphical user interface, modifying instructions corresponding to the at least two of the identified antenna systems, wherein the modifying instructions include modified wireless coupling configurations dictating how the at least one of the identified antenna systems is to wirelessly transfer power to at least one another of the identified antenna systems or how at least one of the identified antenna systems is to wirelessly transfer data to at least one another of the identified antenna systems;
generate modified configuration instructions in accordance with the modified wireless coupling configurations; and
cause communication of the modified configuration instructions to the selected CE devices to direct each of the identified antenna systems to be configured in accordance with the modified configuration instructions.

16. The system of claim 12, wherein the one or more processors, when implementing the executable code, are further configured to:
identify, after configuring each of the identified antenna systems, at least one additional antenna system, wherein the at least one additional antenna system is cooperated with at least one additional CE device, respectively, wherein the at least one additional antenna system comprises a power transfer antenna and one or more communications antennas, wherein the power transfer antenna of the at least one additional antenna system is configured to enable wireless electrical power transfer between the power transfer antenna and at least one other power transfer antenna of another one of the plurality of antenna systems; and
wherein each of the one or more communications antennas of the at least one additional antenna system is configured to enable wirelessly transmitting and receiving communications with at least one further communications antenna;
receive, through the graphical user interface, additional user instructions corresponding to the at least one additional antenna system, wherein the additional user instructions include additional wireless coupling configurations dictating how the at least one additional antenna system is to wirelessly transfer power to at least one other of the identified antenna systems or how the at least one additional antenna system is to wirelessly transfer data to at least one other of the identified antenna systems;
generate additional configuration instructions in accordance with the additional wireless coupling configurations; and
cause communication of the additional configuration instructions to selected CE devices to direct each of the identified antenna systems to be configured in accordance with the additional configuration instructions.

17. The system of claim 11, wherein the one or more processors, when implementing the executable code, are further configured to:
initiate, after identifying the plurality of antenna systems, a communication between a first power transfer antenna of the first antenna system and a second power transfer antenna of the second antenna system to acquire wireless coupling parameters corresponding to the one or more communications antennas of the second antenna system.

18. The system of claim 17, wherein the one or more processors, when implementing the executable code, are further configured to:
authenticate wireless power or wireless data transfer between the first antenna system and the second antenna system based at least in part on the acquired wireless coupling parameters.

19. The system of claim 11, wherein the wireless coupling configurations designate a wireless data transfer protocol to be used for wireless data transfer between the first antenna system and the second antenna system.

20. An apparatus configured to operate within a consumer electronic (CE) device, comprising:
a first power transfer antenna cooperated with a frame, wherein the power transfer antenna is configured to enable at least one of wirelessly receiving electrical power from another CE device and wirelessly transmitting electrical power to another CE device;
a first communications antenna configured to wirelessly transmit and receive communications with one or more other near field wireless antenna systems cooperated with one or more remote CE devices over distances; and a controller configured to:
  identify a plurality of antenna systems including at least a first antenna system and a second antenna system, wherein at least the first antenna system is cooperated with a first CE device and the second antenna system is cooperated with a separate second CE device, wherein each of the plurality of antenna systems comprises a power transfer antenna and one or more communications antennas, wherein the power transfer antenna is configured to enable wireless electrical power transfer between the power transfer antenna and at least one other power transfer antenna of another one of the plurality of antenna systems; and
  wherein each of the one or more communications antennas is configured to enable wirelessly transmitting and receiving communications with at least one further communications antenna;
  provide a graphical user interface, wherein the graphical user interface is configured to illustrate each of the identified antenna systems and communicational relationships between each of the identified antenna systems, wherein the graphical user interface is further configured to enable a user to interact with the graphical user interface;
  receive, through the graphical user interface, user instructions corresponding to at least two of the identified antenna systems, wherein the user instructions include wireless coupling configurations dictating how at least one of the identified antenna systems is to wirelessly transfer power to at least one other of the identified antenna systems or how at least one of the identified antenna systems is to wirelessly transfer data to at least one other of the identified antenna systems;
  generate configuration instructions in accordance with the wireless coupling configurations; and
  cause communication of the configuration instructions to selected CE devices to direct each of the identified antenna systems to be configured in accordance with the configuration instructions.

* * * * *

UNITED STATES PATENT AND TRADEMARK OFFICE
CERTIFICATE OF CORRECTION

PATENT NO. : 10,277,280 B2
APPLICATION NO. : 15/347717
DATED : April 30, 2019
INVENTOR(S) : James Richard Milne, True Xiong and Charles McCoy It is certified that error appears in the above-identified patent and that said Letters Patent is hereby corrected as shown below:

On the Title Page

Item (63), the text reads "Continuation-in-part of application No. 14/460,224, filed on Aug. 14, 2014, now Pat. No. 9,843,360, which is a continuation-in-part of application No. 14/290,409, filed on May 29, 2014, now Pat. No. 9,577,463, which is a continuation-in-part of application No. 14/290,426, filed on May 29, 2014."

It should read --Continuation-in-part of application No. 14/460,224, filed on Aug. 14, 2014, now Pat. No. 9,843,360. Continuation-in-part of application No. 14/290,409, filed on May 29, 2014, now Pat. No. 9,577,463. Continuation-in-part of application No. 14/290,426, filed on May 29, 2014.--

In the Specification

Column 1, Lines 7-17 read "This application is a Continuation-in-Part of U.S. utility patent application serial No. 14/290,409 filed May 29, 2014, entitled "Portable Device to Portable Device Wireless Power Transfer Methods and Systems," U.S. utility patent application serial No. 14/290,426 filed May 29, 2014, entitled "Scalable Antenna System," and U.S. utility patent application serial No. 14/460,224 filed August 14, 2014, entitled "Method and System for Use in Configuring Multiple Near Field Antenna Systems," all of which are incorporated by reference in their entireties for all purposes."

It should read --This application is a Continuation-in-Part of U.S. Patent Application No. 14/290,409 filed May 29, 2014, (now U.S. Patent No. 9,577,463 issued February 21, 2017), U.S. Patent Application No. 14/290,426 filed May 29, 2014, and U.S. Patent Application No. 14/460,224 filed August 14, 2014, (now U.S. Patent No. 9,843,360 issued December 12, 2017), all of which are incorporated by reference in their entireties for all purposes.--

In the Claims

Signed and Sealed this
Twenty-fourth Day of September, 2019

Andrei Iancu
*Director of the United States Patent and Trademark Office*

Column 32, Line 62: directly preceding "CE devices;" insert the text --selected--
Column 32, Line 63: directly following "identified" and directly preceding "antenna systems" insert --plurality of--
Column 32, Line 67: directly preceding "CE devices" insert the text --selected--
Column 33, Line 4: directly preceding "CE devices" insert the text --selected--
Column 33, Line 9: directly preceding "at" cancel the text "the"
Column 33, Line 11: directly preceding "at least one" cancel the text "the"
Column 33, Line 23: directly preceding "antenna systems" insert the text --plurality of--
Column 33, Line 26: directly preceding "antenna systems" insert the text --plurality of--
Column 33, Line 27: directly preceding "antenna systems" insert the text --plurality of--
Column 33, Line 28: directly preceding "antenna systems" insert the text --plurality of--
Column 33, Line 30: directly preceding "antenna systems" insert the text --plurality of--
Column 33, Line 36: directly preceding "antenna systems" insert the text --plurality of--
Column 33, Line 42: directly preceding "antenna systems" insert the text --plurality of--
Column 33, Line 52: directly following "systems;" cancel the text "and"
Column 33, Line 64: directly preceding "antenna systems" insert the text --plurality of--
Column 33, Line 67: directly preceding "antenna systems" insert the text --plurality of--
Column 34, Line 6: directly preceding "antenna systems" insert the text --plurality of--
Column 34, Line 32: directly preceding "comprising:" cancel the text "apparatus" and insert the text --system--
Column 34, Line 35: directly following "such that the" cancel the text "processor" and insert the text --one or more processors--
Column 34, Line 36: directly following "executable code" cancel the text "is" and insert the text --are--
Column 34, Line 50: directly following "systems;" cancel the text "and"
Column 34, Line 54: directly following "antenna" insert a --;--
Column 34, Line 57: directly preceding "antenna systems" insert the text --plurality of--
Column 34, Line 58: directly preceding "antenna systems" insert the text --plurality of--
Column 34, Line 64: directly preceding "antenna systems" insert the text --plurality of--
Column 34, Line 66: directly preceding "antenna" insert the text --plurality of--
Column 35, Line 1: cancel the text "another" and insert the text --other--
Column 35, Line 1: directly preceding "antenna systems" insert the text --plurality of--
Column 35, Line 2: directly preceding "antenna systems" insert the text --plurality of--
Column 35, Line 4: directly preceding "antenna systems" insert the text --plurality of--
Column 35, Line 9: directly preceding "antenna systems" insert the text --plurality of--
Column 35, Line 15: directly preceding "CE devices" insert the text --selected--
Column 35, Line 16: directly preceding "antenna systems" insert the text --plurality of--
Column 35, Line 22: directly preceding "CE devices" insert the text --selected--
Column 35, Line 26: directly preceding "CE devices" insert the text --selected--
Column 35, Line 34: directly following "between" and directly preceding "at least" cancel the text "the"
Column 35, Line 35: directly preceding "CE devices" insert the text --selected--
Column 35, Line 35: directly preceding "at least" cancel the text "the"
Column 35, Line 39: directly preceding "CE devices" insert the text --selected--
Column 35, Line 47: directly preceding "antenna systems" insert the text --plurality of--

CERTIFICATE OF CORRECTION (continued)
U.S. Pat. No. 10,277,280 B2

Column 35, Line 50: directly preceding "antenna systems" insert the text --plurality of--
Column 35, Line 51: directly preceding "antenna systems" insert the text --plurality of--
Column 35, Line 52: directly preceding "antenna systems" insert the text --plurality of--
Column 35, Line 53: directly following "at least one" cancel the text "another" and insert --other--
Column 35, Line 54: directly preceding "antenna systems" insert the text --plurality of--
Column 35, Line 60: directly preceding "antenna systems" insert the text --plurality of--
Column 35, Line 66: directly preceding "antenna" insert the text --plurality of--
Column 36, Line 10: directly following "antenna systems;" cancel the text "and"
Column 36, Line 23: directly preceding "antenna systems" insert the text --plurality of--
Column 36, Line 26: directly preceding "antenna systems" insert the text --plurality of--
Column 36, Line 32: directly preceding "antenna systems" insert the text --plurality of--
Column 36, Line 59: directly preceding "power transfer" insert the text --first--
Column 37, Line 14: directly following "systems;" cancel the text "and"
Column 37, Line 21: directly preceding "antenna systems" insert the text --plurality of--
Column 38, Line 1: directly preceding "antenna" insert the text --plurality of--
Column 38, Line 7: directly preceding "antenna systems" insert the text --plurality of--
Column 38, Line 9: directly preceding "antenna systems" insert the text --plurality of--
Column 38, Line 11: directly preceding "antenna systems" insert the text --plurality of--
Column 38, Line 12: directly preceding "antenna systems" insert the text --plurality of--
Column 38, Line 14: directly preceding "antenna systems" insert the text --plurality of--
Column 38, Line 19: directly preceding "antenna systems" insert the text --plurality of--